United States Patent [19]

Davis et al.

[11] Patent Number: 5,636,719

[45] Date of Patent: Jun. 10, 1997

[54] ROTATIONAL CONTROL APPARATUS

[75] Inventors: John B. Davis, Tonka Bay; Robert C. Bredt, Edina, both of Minn.; Kent Carlson, Lake City; Darren Reasy, Pierpont, both of S. Dak.

[73] Assignee: Horton, Inc., Minneapolis, Minn.

[21] Appl. No.: 373,953

[22] Filed: Jan. 17, 1995

Related U.S. Application Data

[63] Continuation-in-part of Ser. No. 254,290, Jun. 6, 1994, which is a continuation-in-part of Ser. No. 201,783, Feb. 25, 1994.

[51] Int. Cl.$^6$ .................. F16D 25/0638; F16D 67/04; F16D 47/00; F01P 7/02
[52] U.S. Cl. .............. 192/18 A; 192/48.2; 192/48.4; 192/48.91; 192/70.12; 192/113.21; 192/113.23; 310/105
[58] Field of Search .................... 192/18 A, 48.2, 192/48.91, 70.12, 113.21, 113.23, 87.17, 87.16, 113.2, 113.22, 113.36, 48.3, 48.4; 310/105

[56] References Cited

U.S. PATENT DOCUMENTS

| | | |
|---|---|---|
| 726,536 | 4/1903 | Holz. |
| 1,136,279 | 4/1915 | Severy ........................ 192/48.2 X |
| 1,306,784 | 6/1919 | Soames et al.. |

(List continued on next page.)

FOREIGN PATENT DOCUMENTS

| | | |
|---|---|---|
| 0202749 | 11/1986 | European Pat. Off.. |
| 2355205 | 1/1978 | France. |
| 2375494 | 7/1978 | France. |
| 671285 | 2/1939 | Germany. |
| 1020242 | 11/1957 | Germany ........................ 192/48.2 |
| 1020243 | 11/1957 | Germany. |
| 1188191 | 3/1965 | Germany. |
| 1613060 | 1/1971 | Germany. |
| 2653459 | 6/1978 | Germany. |
| 2821973 | 11/1978 | Germany. |
| 3203143 | 8/1983 | Germany. |
| 3443523 | 6/1986 | Germany. |
| 4207710 | 9/1993 | Germany. |
| 59-226721 | 12/1984 | Japan. |
| 61-130630 | 6/1986 | Japan. |
| 390375 | 8/1965 | Switzerland. |
| 1077724 | 8/1967 | United Kingdom. |
| 1268444 | 3/1972 | United Kingdom. |
| 2054279 | 2/1981 | United Kingdom. |

*Primary Examiner*—Rodney H. Bonck
*Attorney, Agent, or Firm*—Peterson, Wicks, Nemer & Kamrath, P.A.

[57] ABSTRACT

Rotational control apparatus in the forms of fan clutches (A, A') are shown including an eddy current drive (224). Specifically, the eddy current drive (224) includes a plurality of permanent magnets (226) mounted circumferentially spaced and with alternating polarity by a holder (228) to the input or output of the clutch (A, A') and a magnetically conductive ring (242) mounted to the other of the input or output of the clutch (A, A'). Thus, the output portion and the fan blades mounted thereto are driven at engine speeds when the clutch (A, A') is air actuated and are driven at a rotational speed less than engine speed by the eddy current drive (224) when the clutch (A, A') is not air actuated and without separate controls for the eddy current drive (224). A housing (62) comprises the output portion of the clutch (A) which is rotatably mounted by a bearing (58) to the hub portion (24) of a friction disc (28) which comprises the input portion of the clutch (A). In other forms, the output portion of the clutch (A') is in the form of a hub (20') rotatably mounted on a stationary shaft (24') and the input portion is in the form of a sheave (50') rotatable relative to the hub (20') and the shaft (24'). Additionally, the hub (20') can be braked by rotatably relating the hub (20') to the shaft (24'). In one form, the friction ring (252) includes peripheral gear teeth (256) in slideable gearing relation with gear teeth (250) formed in the housing (62) and is formed of fiber brake material to act as a dampener between the friction disc (28) and the housing (62) to absorb torsional vibration.

32 Claims, 6 Drawing Sheets

U.S. PATENT DOCUMENTS

| | | |
|---|---|---|
| 1,556,427 | 10/1925 | Coughtry . |
| 1,742,804 | 1/1930 | Carhart ................................ 192/113.23 |
| 1,742,805 | 1/1930 | Carhart ................................ 192/70.2 X |
| 1,935,581 | 11/1933 | Snow, Jr. . |
| 2,221,014 | 11/1940 | Williamson . |
| 2,232,454 | 2/1941 | Haupt ................................ 192/113.26 X |
| 2,241,242 | 5/1941 | Friedman . |
| 2,488,079 | 11/1949 | Sensaud deLavaud et al. . |
| 2,519,449 | 8/1950 | Findley . |
| 2,581,637 | 1/1952 | Danly et al. .................... 192/113.23 |
| 2,597,388 | 5/1952 | Sensaud de Lavaud . |
| 2,658,593 | 11/1953 | Doebeli ................................ 192/48.2 |
| 2,661,148 | 12/1953 | Englander . |
| 2,679,604 | 5/1954 | Jaeschke . |
| 2,714,437 | 8/1955 | Spase ................................ 192/70.2 |
| 2,732,921 | 1/1956 | Rabinow . |
| 2,902,612 | 9/1959 | Whearley ................................ 310/105 |
| 2,937,803 | 5/1960 | Cunningham . |
| 3,167,673 | 1/1965 | Miquel et al. . |
| 3,209,184 | 9/1965 | Woodward, Jr. . |
| 3,229,132 | 1/1966 | Cohen et al. . |
| 3,291,273 | 12/1966 | Hansen . |
| 3,353,641 | 11/1967 | Chana . |
| 3,382,384 | 5/1968 | Hulls . |
| 3,403,275 | 9/1968 | Little . |
| 3,450,910 | 6/1969 | Jaeschke et al. . |
| 3,456,141 | 7/1969 | Burgess . |
| 3,478,239 | 11/1969 | Jaeschke . |
| 3,488,535 | 1/1970 | Baermann . |
| 3,488,536 | 1/1970 | Baermann . |
| 3,566,168 | 2/1971 | Matsubara . |
| 3,601,641 | 8/1971 | Baermann . |
| 3,896,911 | 7/1975 | Beneke . |
| 3,974,408 | 8/1976 | Fehr et al. . |
| 4,094,393 | 6/1978 | Spokas . |
| 4,139,085 | 2/1979 | Kanbe et al. . |
| 4,378,061 | 3/1983 | Schierling et al. . |
| 4,400,638 | 8/1983 | Albrecht et al. . |
| 4,425,993 | 1/1984 | Schilling . |
| 4,446,391 | 5/1984 | Sekine et al. . |
| 4,488,627 | 12/1984 | Streich et al. . |
| 4,498,066 | 2/1985 | Fujiwara et al. . |
| 4,499,409 | 2/1985 | Bauer . |
| 4,508,985 | 4/1985 | Pavlik et al. . |
| 4,526,257 | 7/1985 | Mueller ................................ 192/48.2 |
| 4,540,381 | 9/1985 | Molloy et al. . |
| 4,555,239 | 11/1985 | Miranti ................................ 192/113.23 X |
| 4,564,775 | 1/1986 | Mazzorana . |
| 4,576,266 | 3/1986 | Schilling et al. . |
| 4,688,951 | 8/1987 | Guers . |
| 4,696,378 | 9/1987 | Brooks . |
| 4,718,526 | 1/1988 | Koitabashi . |
| 4,766,986 | 8/1988 | Dayen et al. ................ 192/113.21 X |
| 4,846,326 | 7/1989 | Tilton et al. . |
| 4,907,683 | 3/1990 | Patel ................................ 192/85 AA |
| 4,926,992 | 5/1990 | Linnig . |
| 4,989,708 | 2/1991 | Gaggermeier . |
| 4,997,074 | 3/1991 | Larson et al. ................ 192/85 AA X |
| 5,059,161 | 10/1991 | Bredt . |
| 5,226,517 | 7/1993 | Grochowski . |
| 5,234,090 | 8/1993 | Haka . |
| 5,238,095 | 8/1993 | Pedu . |
| 5,284,230 | 2/1994 | Takaki ................................ 192/113.23 X |
| 5,301,779 | 4/1994 | Nash ................................ 192/70.2 |

ROTATIONAL CONTROL APPARATUS

CROSS REFERENCE

The present application is a continuation-in-part of application Ser. No. 08/254,290 filed Jun. 6, 1994, which is a continuation-in-part of application Ser. No. 08/201,783 filed Feb. 25, 1994.

BACKGROUND

The present invention generally relates to rotational control apparatus such as clutches and brakes, relates particularly to clutches, relates more particularly to fan clutches, and relates specifically to fan clutches having multiple speed drives and/or which are shock resistant for high torsional and vibration conditions.

Although fan clutches of the type shown in FIGS. 1–3 of U.S. Pat. No. 4,425,993 and in U.S. Pat. Nos. 4,226,095 and 4,877,117 have proven to provide precise power, exceptional economy and dependable, long-lived durability, there exists a need to provide improvements to result in a further advantageous clutch. Specifically, a need exists to provide a multiple speed drive clutch for the fan blades mounted thereon. In particular, in a typical fan clutch application for a truck, while the truck is traveling down the road, the engine is operating at relatively high RPMs and air is rapidly passing by the radiator due to the movement of the truck. Thus, it is not necessary that the fan blades be driven at engine speed under these conditions, and it is advantageous to drive the fan blades at slower speeds or to stop fan rotation for at least noise and/or power consumption reduction reasons. However, when the truck is parked and the engine is idling, maximum cooling is required such that the fan blades are driven at engine speed (or even faster than engine speed). Similarly, cooling requirements for other large engines such as for earth moving equipment or like applications and even for stationary applications vary according to various factors including ambient temperature, air flow, engine speed, and the like.

Further, the axially displaceable components of a fan clutch are subjected to high torsional and vibration conditions due to its interconnection to the crank shaft of the engine which is rotated by the reciprocating action of pistons. High torsional and vibration conditions result in loss of tolerance in the axially displaceable components in preventing relative rotation between the components and in the reduction of the clutch life. Thus, a need exists to provide a clutch which provides a dampening effect within the clutch to increase dependability and long-lived durability and having components which would be damaged by excessive torsional and vibration stress and/or loads being normally replaceable to increase economy.

SUMMARY

The present invention solves these needs and other problems in the field of rotational control apparatus and particularly fan clutches by providing, in the most preferred form, an eddy current drive in addition to an axially displaceable friction ring which engages with a friction disc, with the output portion of the clutch being driven by the friction disc and ring when engaged and being driven by the eddy current drive when the friction disc and ring are disengaged. In a first aspect of the most preferred form of the present invention, the friction ring is axially engaged by fluid pressure introduced in the pressure cylinder defined by a piston for moving the piston and such that separate controls are not necessary for the eddy current drive.

In further aspects of preferred forms of the present invention, the eddy current drive is mounted in the clutch in a manner to reduce the number of clutch components and minimize the overall axial length and radial size. Specifically, one of the drive components of the eddy current drive is mounted to the input portion of the clutch while the other component is mounted directly on the friction interface member of the output portion for axial movement therewith in a first form or is mounted on the housing rotatably related to the friction interface member of the output portion in an alternate form. In one of the most preferred forms, the eddy current drive is located at the same radial spacing from the clutch axis as the friction ring.

In another aspect of a preferred form of the present invention, a hub rotatable relative to a shaft is rotatably related to the shaft when the input is not rotatably related to the friction disc which is slideably mounted on and rotationally related to the hub. In the most preferred form, the shaft is stationary and it is an aim of the present invention to brake the output portion to prevent the fan blades from windmilling and from being driven by an eddy current drive.

In a further aspect of the present invention, air flow is created between the first and second drive components of the rotational control apparatus by vanes which rotate with the input. In the preferred forms, the output includes openings located radially inward of the first and second drive components through which the air flow between the first and second drive components passes. In the most preferred form, the vanes are mounted radially outward of the first and second drive components and in particular to the annular support which mounts the drive component to the input.

It is thus an object of the present invention to provide a novel rotational control apparatus.

It is further an object of the present invention to provide such a novel rotational control apparatus in the form of a fan clutch.

It is further an object of the present invention to provide such a novel rotational control apparatus having ease of serviceability.

It is further an object of the present invention to provide such a novel rotational control apparatus which includes a multiple speed drive.

It is further an object of the present invention to provide such a novel rotational control apparatus having reduced noise.

It is further an object of the present invention to provide such a novel rotational control apparatus having reduced squeal.

It is further an object of the present invention to provide such a novel rotational control apparatus having reduced power consumption.

It is further an object of the present invention to provide such a novel rotational control apparatus which is shock resistant for high torsional and vibration conditions.

It is further an object of the present invention to provide such a novel rotational control apparatus having an improved axially displaceable friction ring which provides a dampening effect within the apparatus.

It is further an object of the present invention to provide such a novel rotational control apparatus including components which would be damaged by torsional and vibration stress and/or loads to be normally replaceable.

It is further an object of the present invention to provide such a novel rotational control apparatus preventing fan blades mounted to the output portion of the clutch from windmilling.

It is further an object of the present invention to provide such a novel rotational control apparatus including components which rotatably relate the output portion to a further portion than the input portion.

It is further an object of the present invention to provide such a novel rotational control apparatus including an eddy current drive.

It is further an object of the present invention to provide such a novel rotational control apparatus including an eddy current drive which is overridden by braking components.

It is further an object of the present invention to provide such a novel rotational control apparatus designed to be simple.

It is further an object of the present invention to provide such a novel rotational control apparatus which is reliable.

It is further an object of the present invention to provide such a novel rotational control apparatus of a multi-speed design which reduces the number of clutch components.

It is further an object of the present invention to provide such a novel rotational control apparatus of a multi-speed design which minimizes the overall axial length and radial size.

It is further an object of the present invention to provide such a novel rotational control apparatus having enhanced cooling of the drive components.

It is further an object of the present invention to provide such a novel rotational control apparatus including vanes which create air flow between the drive components.

These and further objects and advantages of the present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
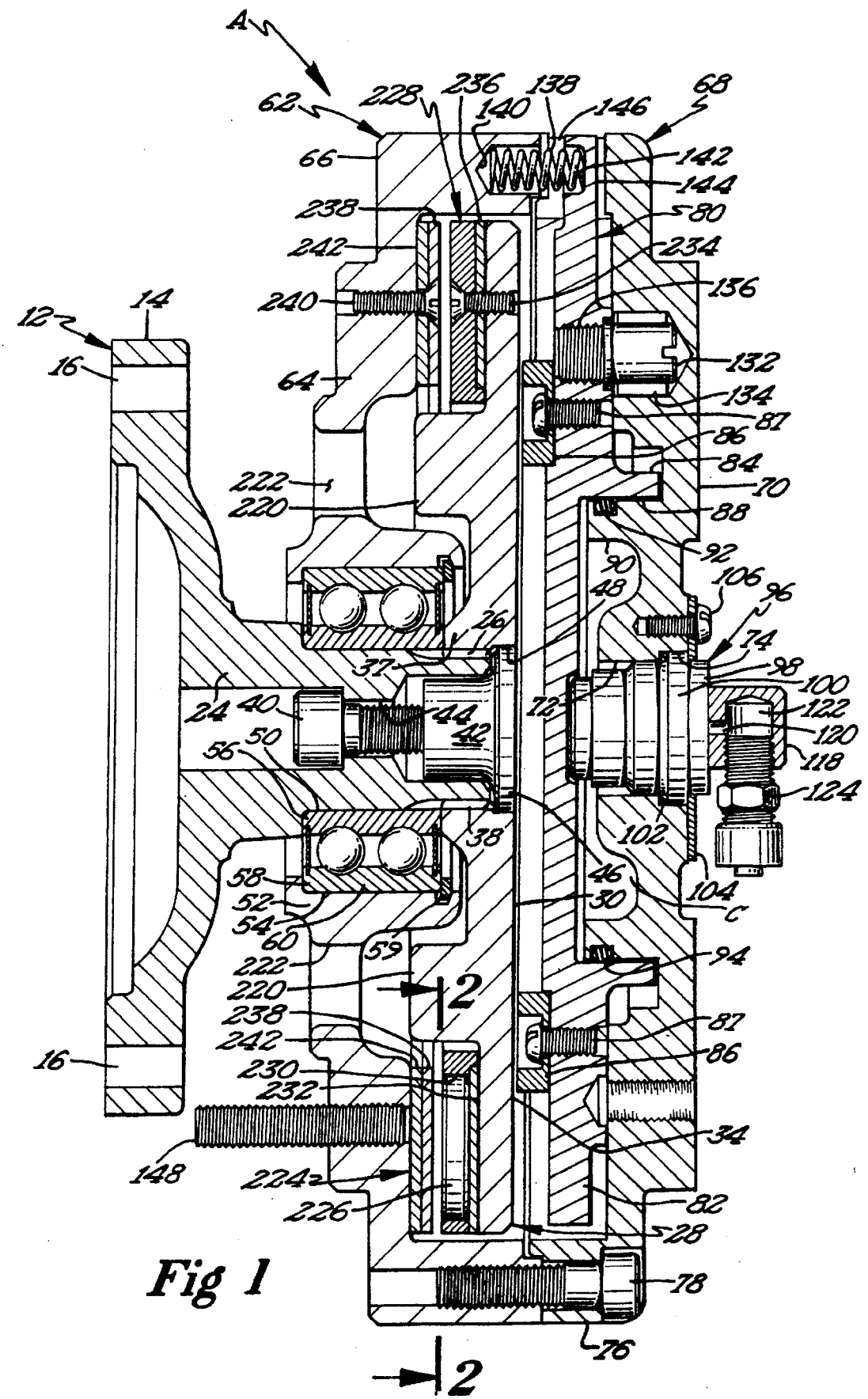
FIG. 1 shows a cross-sectional view of a rotational control apparatus in a first, preferred form of a fan clutch according to the preferred teachings of the present invention.

The figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the figures of the drawings, the same numerals designate the same or similar parts. Furthermore, when the terms "first", "second", "internal", "radial", "axial", "inward", "outward", and similar terms are used herein, it should be understood that these terms have reference only to the structure shown in the drawings as it would appear to a person viewing the drawings and are utilized only to facilitate describing the invention.

DESCRIPTION

Rotational control apparatus according to the preferred teachings of the present invention is shown in FIGS. 1–4 of the drawings in the preferred form of a fan clutch and is generally designated A. In most preferred embodiments of the present invention, clutch A is an improvement of the type shown and described in FIGS. 1–3 of U.S. Pat. No. 4,425,993. For purpose of explanation of the basic teachings of the present invention, the same numerals designate the same or similar parts in the present FIGS. 1–4 and the figures of U.S. Pat. No. 4,425,993. The description of the common numerals and clutch A may be found herein and in U.S. Pat. No. 4,425,993, which is hereby incorporated herein by reference.

Referring to the drawings in detail, fluid engaged spring released clutch A includes an annular mount 12 having an annular flange 14 which is formed with a series of spaced holes 16 for bolting or otherwise attaching annular mount 12 to a sheave or other driven member which is rotated about a clutch axis by a conventional mechanism (not shown) within the engine block. Flange 14 terminates radially inwardly in a hollow hub portion 24 formed with splines 26 thereon.

Further provided is a friction disc 28 including a circular main body portion 30 having an annular friction engageable surface or portion 34. Disc 28 is formed with an axial hollow hub 37 formed with internal splines 38 in engagement with splines 26 of hub portion 24. Mount 12 is secured and fixed in a splined relationship to body portion 30 of friction disc 28 by means of an axially mounted bolt 40 threadedly engaged in a clamping disc 42 through an axial hole 44 of hub portion 24.

Disc 42 has an annular flange portion 46 in secure engagement with an annular recess 48 formed in body portion 30. Hub portion 24 is formed with an external annular recess 50. A housing hub 52 is formed with a companion annular recess 54, with the inner race 56 of a bearing 58 press fit in recess 50 and the outer race 60 of bearing 58 press fit in recess 54. Bearing 58 is retained in recess 54 by means of a retaining ring 59 and in recess 50 by hub 37.

Hub 52 is part of a first outer shell housing 62, with hub 52 terminating in an annular and radially extending body portion 64 which terminates in an offset portion 66 located radially outward of friction disc 28 and extending axially from body portion 64 beyond surface 34 of friction disc 28. A second outer shell housing 68 includes an annular main body portion 70 formed with an axial hole 72 terminating outwardly in an annular recess 74. Main body portion 70 terminates radially outwardly in a right angular flange 76. First outer shell housing 62 is secured to second outer shell housing 68 by means of spaced bolts 78. Thus, housings 62 and 68 are rotatable relative to friction disc 28 by bearing 58 about the clutch axis.

An annular piston 80 includes a circular and center body portion 82 which terminates in an outwardly offset and radially disposed annular flange portion 84. An inner annular surface 88 of annular flange 84 forms a cylindrical surface. Formed internally of main body portion 70 of shell housing 68 is an annular flange portion 90 slideably positioned relative to surface 88 of flange 84. On the outer surface of portion 90 is formed an annular recess 92 in which is positioned an O-ring 94 in sealing engagement with surface 88 of flange 84 thereby forming a pressure cylinder C.

Positioned within axial hole 72 is a rotary air union 96 which includes a substantially cylindrical body 98 having an annular shoulder 100 which fits in annular recess 74 and sealed by an O-ring 102. Rotary air union 96 is secured in axial hole 72 and annular recess 74 by means of a circular flat ring 104 secured upon the outer surface of body portion 70 of second shell housing 68 by means of spaced bolts 106 and in abutment with and upon annular shoulder 100 of air union 96.

Rotatably received within cylindrical body 98 is a stationary air union portion 118 formed with an axial hole 120 which terminates in a right angularly disposed hole 122 connected by a union 124 to a fluid supply line, not shown. Air union portion 118 has mounted thereon a suitable bearing which is within air union body 98 whereby the entire clutch A may rotate about the clutch axis about stationary air union portion 118, with rotary air union 96 providing fluid communication with cylinder C.

A series of bolts 148 are threadedly engaged in first shell housing 62 and each extend through a hole in the spider hub portion of fan blades, not shown.

Figure 2:
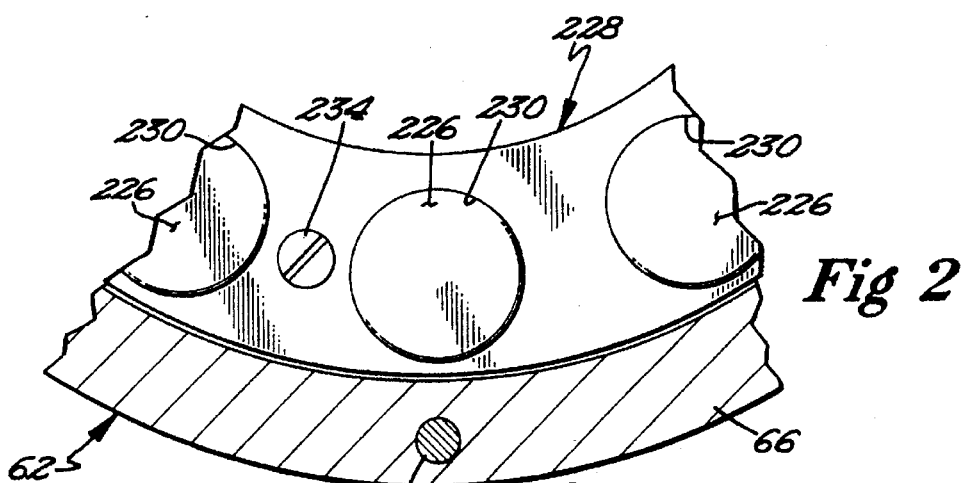
FIG. 2 shows a partial, cross-sectional view of the rotational control apparatus of FIG. 1 according to section line 2—2 of FIG. 1.

In the form shown in FIGS. 1 and 2, a friction ring 86 is mounted on portion 82 such as by screws 87 in axial alignment with frictional engagement portion 34 of friction disc 28. In the form shown in FIGS. 1 and 2, a series of spaced torque pins 132 are slideably mounted on one end in a bushing 134 which is secured by press fitting in body portion 70 of second shell housing 68. The other ends of torque pins 132 are threaded or otherwise secured in a hole 136 formed in piston 80. A series of spaced return springs 138 are mounted on one end in a hole 140 formed in offset portion 66 of first outer shell housing 62. The other ends of return springs 138 are mounted in a recess 142 formed in a tab 144 formed in the outer periphery of piston 80 and extending into a void 146 formed between shell housings 62 and 68. It will be seen that the springs 138 normally urge piston 80 and friction facing ring 86 thereon from friction portion 34 of friction disc 28.

Clutch A as described thus far is generally of the type shown and described in U.S. Pat. No. 4,425,993. However, it can be appreciated that other constructions may be applicable to utilize the teachings of the present invention including but not limited to the construction shown in FIGS. 5–10.

In most preferred forms of the present invention, circumferentially spaced cooling vanes or fins 220 are integrally formed and extend axially from the axial side of body portion 30 opposite to friction engageable portion 34 and located radially intermediate hub 37 and the outer periphery of body portion 30. Circumferentially spaced air vent openings or apertures 222 are formed in body portion 64 at a radial spacing from hub 52 corresponding to and in alignment with cooling fins 220.

Figure 4:
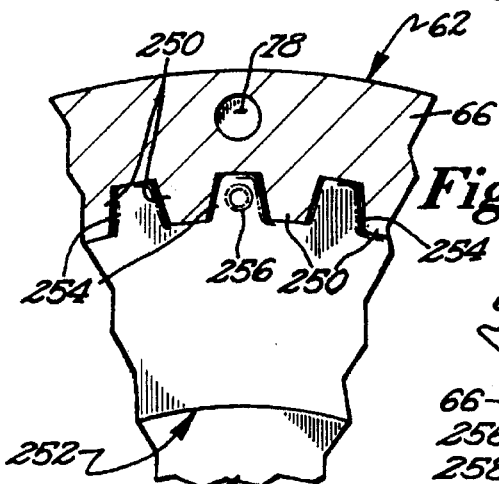
FIG. 4 shows a partial, cross-sectional view of the rotational control apparatus of FIG. 3 according to section line 4—4 of FIG. 3.
Figure 3:
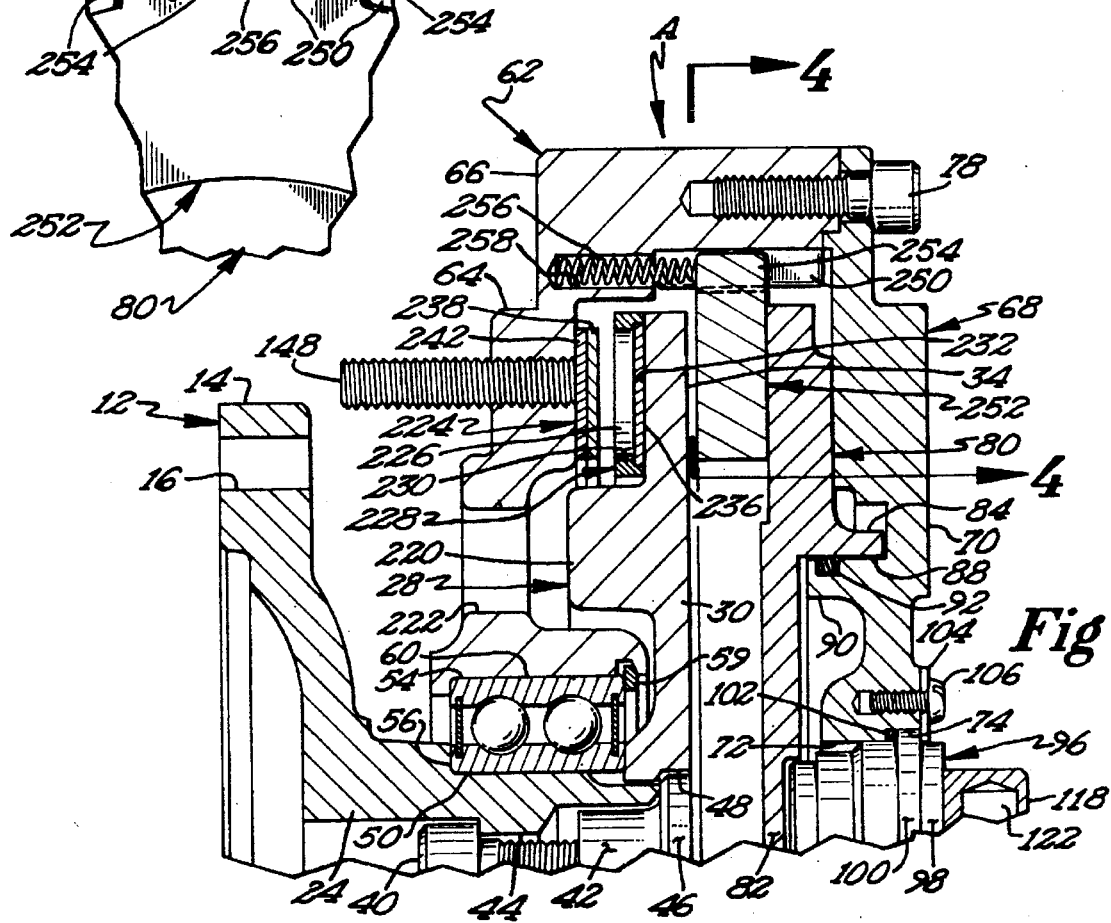
FIG. 3 shows a partial, cross-sectional view of a rotational control apparatus in a second, preferred form of a fan clutch according to the preferred teachings of the present invention.

In a further, preferred form of clutch A of the present invention as shown in FIGS. 3 and 4, offset portion 66 of housing 62 includes internal, axially extending gear teeth 250. A fiber friction ring 252 is further provided including axially extending gear teeth 254 on its outer periphery. Teeth 254 are in gearing relation with teeth 250. Thus, teeth 250 and 254 define interfitting portions formed on housing 62 and friction ring 252, respectively, to rotatively fix friction ring 252 to offset portion 66 and housing 62 but allow friction ring 252 to be axially displaceable relative to offset portion 66 and housing 62. Friction ring 252 is biased away from friction disc 28 by means of a series of springs 256. Springs 256 are mounted in one end of a hole 258 formed in offset portion 66 circumferentially intermediate teeth 250 such that springs 256 are within the radial extent of teeth 250. The other end of springs 256 abut with friction lining 252.

Alternate forms of rotational control apparatus according to the preferred teachings of the present invention are shown in FIGS. 5–10 of the drawings in the preferred form of a fan clutch and are generally designated A'. In most preferred embodiments of the present invention, clutch A' is an improvement of the type shown and described in U.S. Pat. Nos. 4,226,095; 4,877,117; and 5,059,161. For purpose of explanation of the basic teachings of the present invention, the numerals including a prime (') notation in FIGS. 5–10 designate the same or similar parts for the same numeral notation in the figures of U.S. Pat. Nos. 4,226,095; 4,877, 117; and 5,059,161. The description of the same or similar parts and clutch A' may be found herein and in U.S. Pat. Nos. 4,226,095; 4,877,117; and 5,059,161, which are hereby incorporated herein by reference.

Referring to the drawings in detail, clutch A' includes a first output member to be driven in the form of an annular piston 10' which has formed thereon the annular friction disc 12' and the internal annular base portion 14'. Formed internally of annular base portion 14' are the torque transmitting surfaces in the form of internal splines 16' which engage with the external torque transmitting surfaces in the form of splines 18' of the hub 20'. Thus, friction disc 12' is slideably mounted on and rotationally related to hub 20' by splines 16' and 18'. The hub 20' is rotatably mounted on the reduced outward end 22' of stationary shaft 24' by means of the bearings 26' and 28'.

The numeral 30' designates an annular cylinder block in which is slideably mounted the annular piston 10' with sealing engagement by means of the O-ring 32' mounted in the annular groove formed in the piston 10' and the O-ring 36' mounted in the annular groove 38' formed in the cylinder 30'. The cylinder 30' is secured and rotationally related to the hub 20' by means of a multiplicity of spaced bolts 40' which extend through clearance holes 30a' in the cylinder block 30' and engage threaded holes 41a' in hub 20'. Air pressure is introduced through shaft 24' and into cylinder C by conventional conduit means 42' including a suitable rotary union.

Mounted on the hub 20' are the bearings 146' and 148' which rotatably mount an input in the form of the sheave 50' which is typically driven by the engine crank shaft by belts. The numeral 62' designates a washer slideably received on hub 20' and sandwiched between splines 18' and bearing 146'. Further provided is the compression coil spring 56' sandwiched between washer 62' and piston 10'. Friction facing ring 86 is mounted on the side of sheave 50' such as by screws 87 in axial alignment with annular friction engagable surface or portion 34 on friction disc 12'. In the most preferred form, a steel ring 235 is sandwiched between ring 86 and sheave 50'. The facing 86 engages the annular friction engagable portion 34 when air pressure is introduced into cylinder C thereby clutching in and rotatably relating the friction disc 12', the hub 20' and the cylinder block 30' on which fan blades of a fan 300 may be mounted on the pilot extension 53' and secured by means of nut-equipped studs 55' on the cylinder block 30'. With facing 86 engaging annular friction engagable portion 34, hub 20', cylinder block 30' and fan 300 mounted thereon will rotate at the same speed or in other words a 1:1 ratio with respect to sheave 50'.

Clutches A and A' according to the preferred teachings of the present invention further include an eddy current drive 224 between the input and output portions of clutches A and A'. Specifically, in the preferred form, drive 224 includes a first drive component shown as a plurality of circumferentially spaced permanent magnets 226 radially spaced from the rotation axis of clutch A or A'. In the most preferred form, magnets 226 are in the form of discs and are radially oriented and held at circumferentially spaced locations with alternating polarity to the input by an annular magnetic holder 228 including a plurality of apertures 230 formed therein for receipt and holding of magnets 226. Holder 228 is formed from generally nonmagnetic material such as aluminum for magnetically isolating magnets 226 in holder 228 from each other. In clutches A of FIGS. 1–4 of the most preferred form, holder 228 and magnets 226 mounted therein are mounted to an axially inner, radially oriented or extending surface 232 of body portion 30 of friction disc 28 opposite to friction engageable portion 34 and radially spaced outwardly from fins 220 such as by axially extending screws 234. In clutch A' of FIG. 5 of the most preferred form, holder 228 and magnets 226 mounted therein are mounted to an axially inner, radially oriented or extending surface 232 of the side of sheave 50' radially outward of friction facing ring 86. In clutch A' of FIG. 7 of the most preferred form, holder 228 and magnets 226 mounted therein are mounted to a radially oriented or extending surface 232 on the opposite axial side of annular friction disc 12' than surface 34. Sandwiched between surface 232 and holder 228 including magnets 226 is a ring 236 formed of magnetic flux conductive material such as steel, with screws 234 extending through suitable apertures formed in ring 236. In clutch A' of FIG. 5, rings 235 and 236 can be integrally formed together or as separate components.

Figure 5:
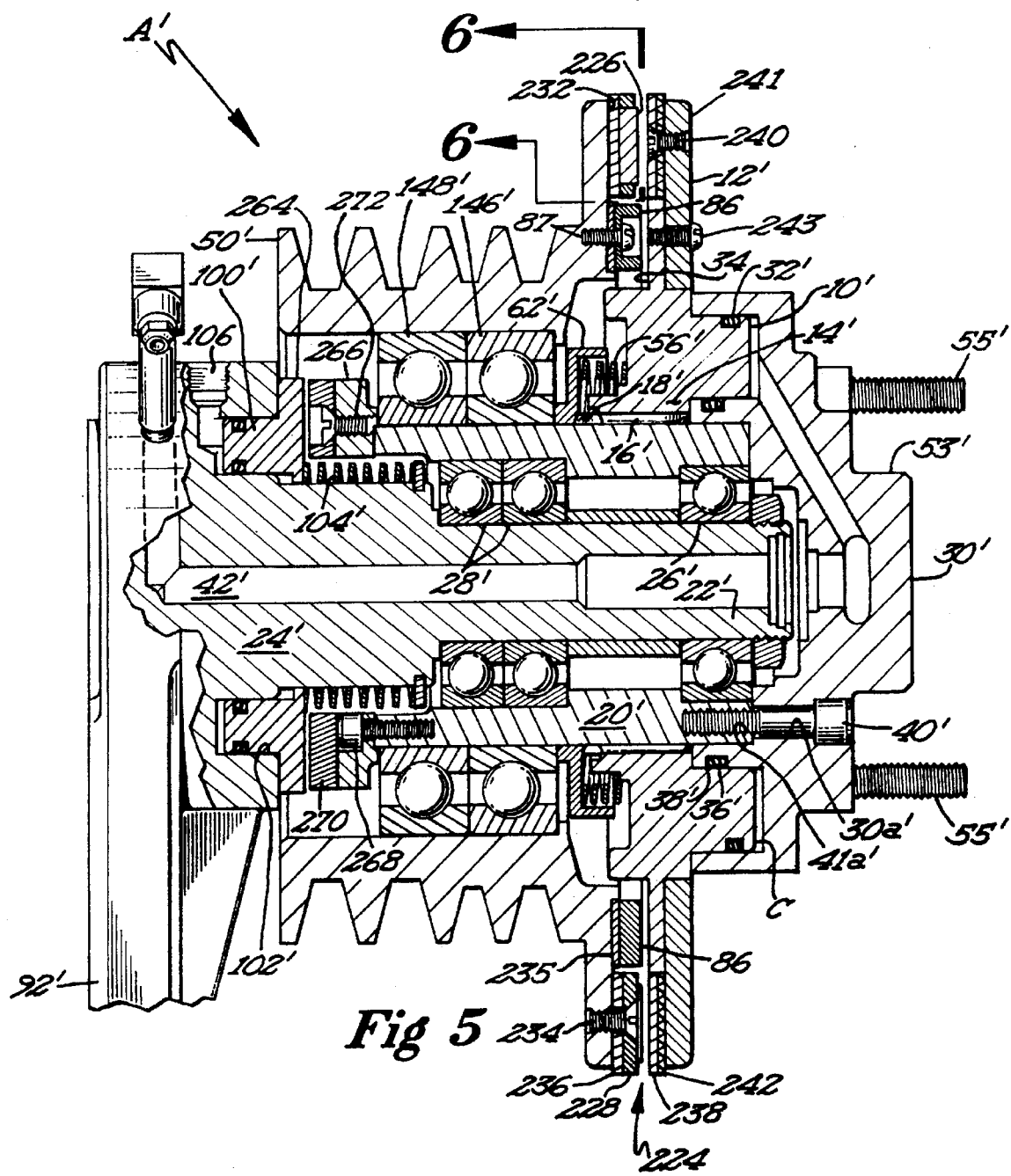
FIG. 5 shows a cross-sectional view of a rotational control apparatus in a third, preferred form of a fan clutch according to the preferred teachings of the present invention.
Figure 6:
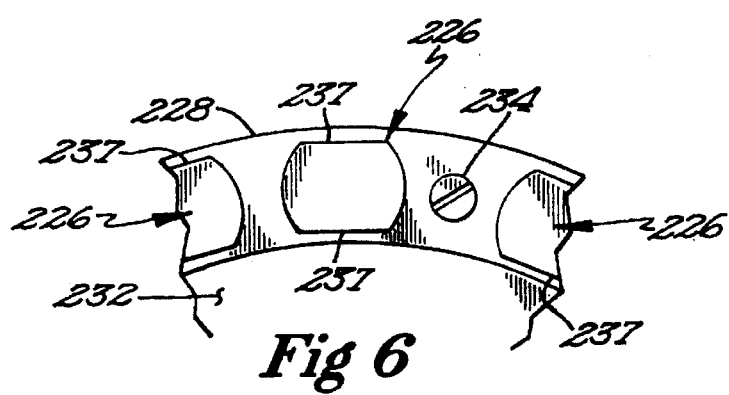
FIG. 6 shows a partial, cross-sectional view of the rotational control apparatus of FIG. 5 according to section line 6—6 of FIG. 5.
Figure 7:
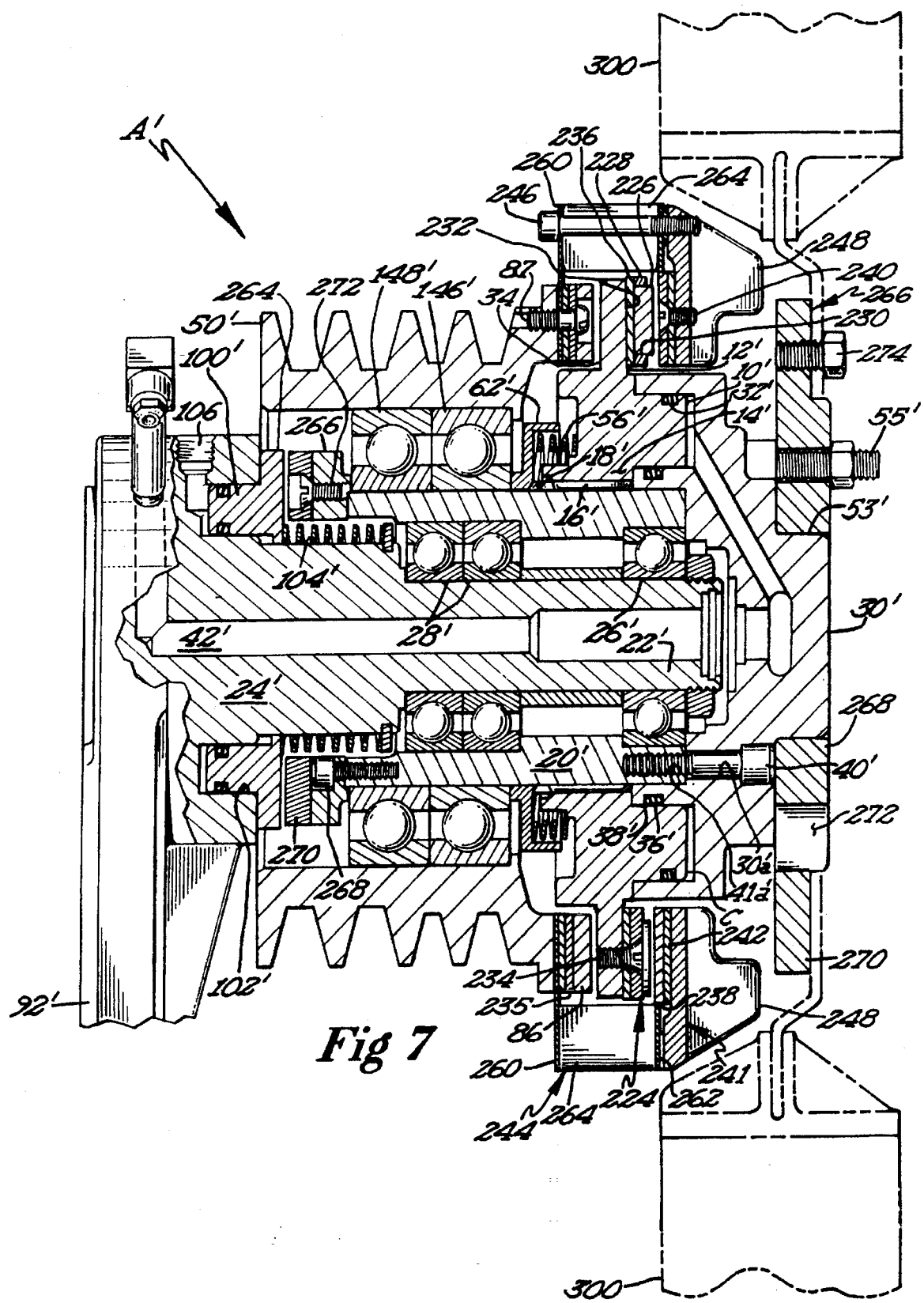
FIG. 7 shows a cross-sectional view of a rotational control apparatus in a fourth, preferred form of a fan clutch according to the preferred teachings of the present invention.
Figure 8:
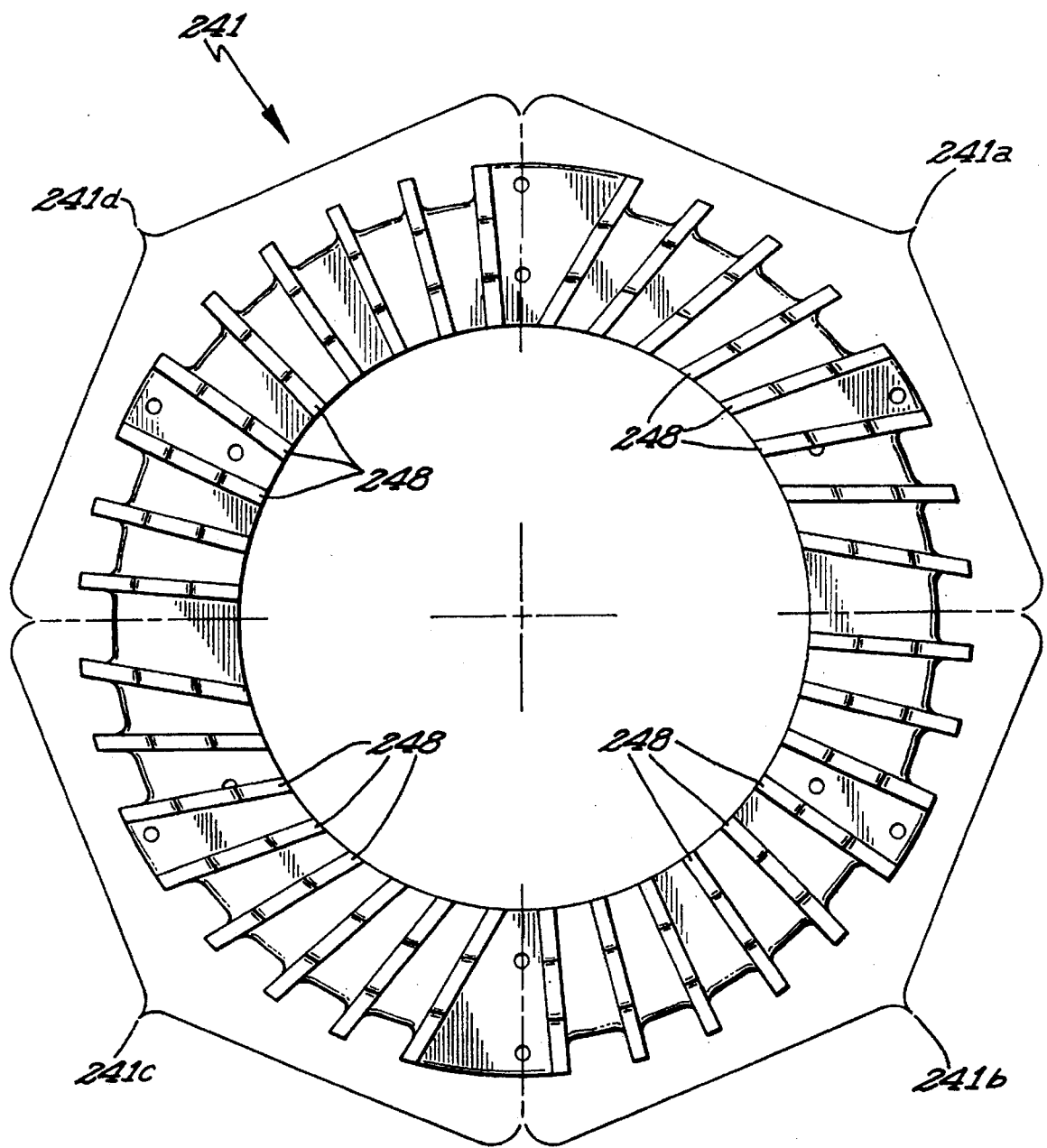
FIG. 8 shows an end elevational view of the annular body portion of the rotational control apparatus of FIG. 7.
Figure 9:
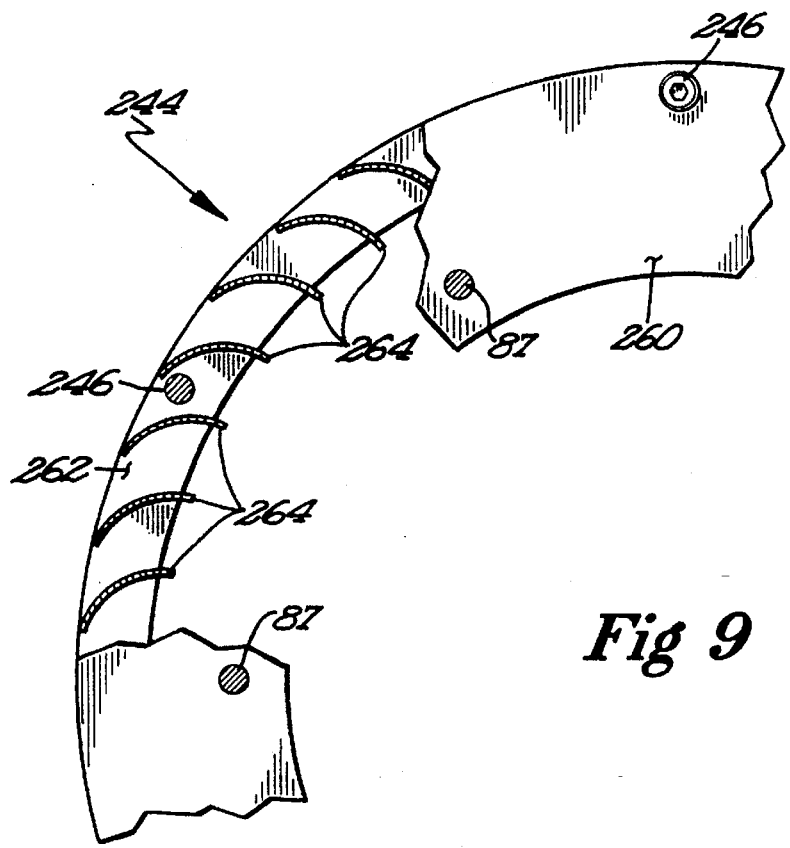
FIG. 9 shows a partial, end elevational view of the annular support of the rotational control apparatus of FIG. 7, with portions broken away to show the internal construction.
Figure 10:
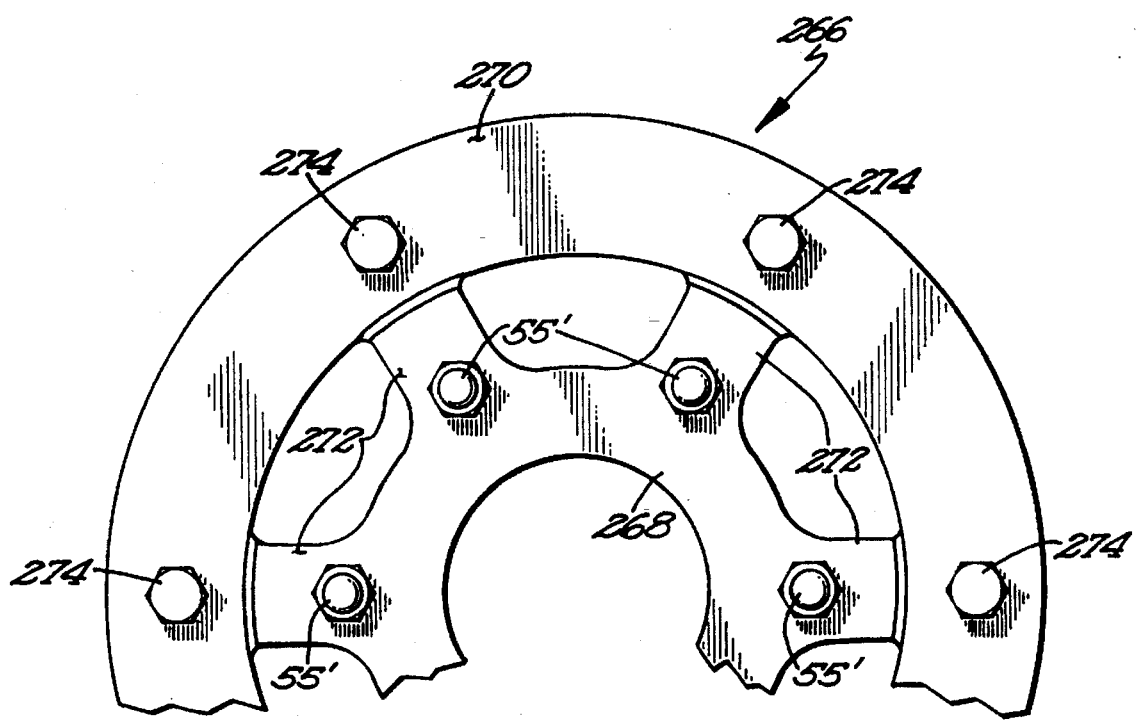
FIG. 10 shows a partial, end elevational view of the fan mount of the rotational control apparatus of FIG. 7.

In the preferred form, magnets 226 are generally in the form of circular discs as best seen in FIGS. 2 and 6. In clutch A' of the most preferred form as shown in FIGS. 5 and 7, the discs are generally oval shape and include first and second surfaces 237 located along parallel chords of the circular shape on opposite sides and equally spaced from the center of the circular shape. First and second surfaces 237 are arranged generally perpendicular to a radius from the clutch axis. Thus, the overall radial size of holder 228 and of eddy current drive 224 can be minimized to allow clutch A' of the present invention including eddy current drive 224 to be easily substituted in prior installations utilizing the clutches of the type disclosed in U.S. Pat. Nos. 4,226,095; 4,877,117; and 5,059,161 or the like.

Drive 224 further includes a second drive component shown as a smooth ring 238 formed of electrically conductive material such as copper and in the most preferred forms is radially oriented. In clutches A of FIGS. 1–4 of the most preferred form, ring 238 is mounted on the output portion spaced radially outward of friction engageable portion 34 at a radial location corresponding to magnets 226 such as by screws 240 to the axial surface of body portion 64 of housing 62 and spaced radially outward of air vent apertures 222 at the radial location corresponding to magnets 226.

In clutch A' of FIGS. 5–10 of the most preferred form, ring 238 is mounted such as by screws 240 to the axial surface of an annular body portion 241. In clutch A' of FIG. 5, annular body portion 241 is mounted on the output portion and specifically is secured to friction disc 12' such as by bolts 243. In clutch A' of FIG. 7 of the most preferred form, annular body portion 241 is mounted on the input portion and specifically is secured to sheave 50' such as by an annular support 244. In the most preferred form, annular support 244 includes a first annular disc portion 260 sandwiched between ring 235 and the side of sheave 50' and which is secured therebetween by screws 87. Annular support 244 further includes a second annular disc portion 262 located parallel to but spaced from annular disc portion 260. Air moving vanes 264 are sandwiched between and secured to disc portions 260 and 262 at circumferentially spaced locations. Annular support 244 is in turn secured to annular body portion 241 by screws 246 extending through portions 260 and 262 intermediate vanes 264 of support 244 and threaded into annular body portion 241. Disc portion 260 and ring 235 can be integrally formed together or as separate components. A ring 242 formed of magnetic flux conductive material such as steel is sandwiched between ring 238 and body portion 64 or 241, with screws 240 extending through suitable apertures formed in ring 242. Annular body portion 241 is formed of aluminum and acts as a heat sink. Therefore, as heat is drawn to annular body portion 241 from rings 238 and 242, radiation heating of magnets 226 by ring 238 is minimized.

Circumferentially spaced cooling fins 248 may be provided on annular body portion 241 opposite rings 238 and 242 for cooling ring 238. According to the preferred teachings of the present invention, fins 248 are configured to achieve both angular and perpendicular air flow. Specifically, in the most preferred form, fins 248 in the first and third quadratures 241a and c are arranged at an acute angle in the order of 30° from radial lines in the direction of rotation whereas fins 248 in the second and fourth quadratures 241b and d are arranged along radial lines from the clutch axis. It should be appreciated that fins 248 must also be configured in a manner which does not interfere with fan 300 which in the most preferred form is not supplied with clutch A' and specifically must be configured so as to allow relative rotation between fan 300 and annular body portion 241 whatever type of fan 300 is mounted on clutch A'.

Because fan 300 is not supplied with clutch A' in the most preferred form and to insure that air flow is allowed past the front of cylinder block 30' and radially inward of drive 224 and fins 248 independent of the actual fan 300 mounted on cylinder block 30', a fan mount 266 is provided with clutch A' in the most preferred form. In particular, mount 266 includes a central annular portion 268 of a diameter for slideable receipt and mounting on pilot extension 53' of cylinder block 30'. Mount 266 further includes an outer annular portion 270 of a size larger than annular portion 268. Circumferentially spaced. legs 272 integrally extend between portions 268 and 270 to hold them in a spaced, concentric arrangement. In the most preferred form, annular portion 270 has an axial thickness less than that of legs 272 and/or portion 268 to form a pilot extension for slideable receipt of fan 300. Bolts 274 can be provided extending through fan 300 and threaded into portion 270 for securing fan 300 to mount 266. Mount 266 in turn can be secured to cylinder block 30' by studs 55' extending through annular portion 268 and/or legs 272. It can then be appreciated that air flow is allowed through openings defined by and intermediate annular portions 268 and 270 and legs 272.

It should be appreciated that the construction of clutches A and A' according to the preferred teachings of the present invention is believed to be advantageous. Specifically, considerable heat can be generated by slippage of friction disc 28 and 12' and friction ring 86 or 252. Further, heat is also generated by the rotation of magnets 226 relative to rings 238 and 242. Friction disc 12' or 28 or sheave 50' acts as a heat sink to draw heat away from magnets 226. Likewise, annular portion 241 acts as a heat sink to draw heat from rings 238 and 242 and thus away from magnets 226. Additionally, rotation of cooling vanes or fins 220 with friction disc 28 pulls air into housings 62 and 68 to provide cooling to eddy current drive 224 and specifically providing air flow intermediate the components of eddy current drive 224 and particularly intermediate magnets 226 and ring 238. Likewise, rotation of cooling fins 248 and vanes 264 with sheave 50' at all times when the engine is running increases heat transfer from annular body portion 241. In particular, fins 248 draw air from the front of cylinder block 30' radially inward of drive 224 and in the most preferred form intermediate annular portions 268 and 270 and legs 272 to provide cooling of body portion 241 by convection. Additionally, vanes 264 draw air from the front of cylinder block 30' radially inward of drive 224 and in the most preferred form intermediate annular portions 268 and 270 and legs 272 to provide cooling of magnets 226 and ring 238 by convection. In this regard, vanes 264 move the air outwardly to create a pressure differential which draws air betwteen magnets 226 and ring 238 to create air flow therebetween which would likely not occur or would be practically non-existent if air movement means would not be included. As the performance and life of magnets 226 may be detrimentally affected by heat, clutches A and A' according to the preferred teachings of the present invention protect magnets 226 from excessive heat conditions.

In operation of clutch A and assuming the input portion of clutch A, i.e. mount 12, is being rotated by conventional means hereinbefore referred to, the fan blades are rotated about the axis of clutch A by introducing fluid pressure through rotary air union 96 into cylinder C which forces piston 80 in the direction towards friction disc 28 whereby the friction engagement surface of friction ring 86 or 252 engages the friction engagement surface of friction disc 28 to rotatably relate the input and output portions of clutch A. As a result of the above, which is contrary to the urging of springs 138 or 256, the output portion of clutch A, i.e. housings 62 and 68 with the fan blades thereon, are rotated generally at the rotational speed of mount 12 and friction disc 28. With the fluid pressure released, springs 138 or 256 urge friction ring 86 or 252 from engagement with friction disc 28 whereby friction ring 86 or 252 is separated or disengaged from friction disc 28 such that the output portion of clutch A is rotationally independent of the input portion.

In operation of clutch A' and assuming the input portion of clutch A', i.e. sheave 50', is being rotated by conventional means hereinbefore referred to, the fan blades are rotated about the axis of clutch A' by introducing fluid pressure through conduit means 42' into cylinder C which forces piston 10' in the direction towards sheave 50' whereby the friction engagement surface of friction ring 86 engages the friction engagement surface or portion 34 to rotatably relate the input and output portions of clutch A'. As a result of the above, which is contrary to the urging of springs 56', the output portion of clutch A', i.e. annular cylinder block 30' with the fan blades thereon, are rotated generally at the rotational speed of sheave 50'. With fluid pressure released, springs 56' urge friction disc 12' from engagement with friction ring 86 whereby friction ring 86 is separated or disengaged from portion 34 such that the output portion of clutch A' is rotationally independent of the input portion.

Due to their mounting on the input portions, magnets 226 of clutches A and A' of FIGS. 1–5 and ring 238 of clutch A' of FIG. 7 rotate at the rotational speed of the input portions. Due to eddy current principles, forces between magnets 226 and ring 242 induce rotation of the output portions of clutches A and A'. The rotational speed of the output portions of clutches A and A' is less than the rotational speed of the input portions due to the torque load placed upon the output portions by the fan blades in the most preferred form. The rotational speed of the output portions relative to the input portions is then dependent upon the number and strength of magnets 226, the axial spacing between magnets 226 and rings 238 and 242, the speed of rotation of the input portions, and the torque load placed upon the output portions.

It can then be appreciated that when greater cooling requirements exist such as at low engine RPMs, fluid pressure is introduced into cylinder C causing rotation of the output portions and the fan blades thereon at the rotational speed of the input portions which typically will be at engine speeds. However, if lesser cooling requirements exist such as at high engine RPMs, fluid pressure is released causing rotation of the output portions and the fan blades thereon at a rotational speed less than the input portions through eddy current drive 224. It can further be appreciated that lower rotational speeds of the fan blades result in reduced power consumption and in reduced noise generation and thus is very advantageous.

It should then be noted that permanent magnet eddy current drives for fan clutches are known which provide for fan rotation at speeds less than engine speed but which do not provide direct drive with the engine speed. Further, electromagnetically operable clutches are known which provide for fan rotation at engine speed through a first electromagnetic clutch and at lower than engine speed through a second electromagnetic clutch via an eddy current coupling. However, persons skilled in the art did not recognize the synergistic results which are obtainable utilizing a permanent magnet eddy current drive in combination with a nonelectromagnetically controlled clutch and specifically with a fluid and particularly an air actuated clutch. In particular, it should be noted when clutches A and A' of the present invention shown in the Figures are actuated in the most preferred form by the introduction of fluid pressure, clutches A and A' of the present invention rotate the fan blades at engine speeds with eddy current drive 224 and specifically magnets 226 and holder 228 and also rings 238 and 242 rotating at engine speeds due to their connection to output and input portions of clutches A and A'. Thus, the engagement of annular friction engageable portion 34 with friction ring 86 or 252 overrides eddy current drive 224 due to the simultaneous rotation of magnets 226 and rings 238 and 242. Thus, clutch A of the present invention operates in the same manner as clutch A of U.S. Pat. No. 4,425,993 and clutch A' of the present invention operates in the same manner as the clutches of U.S. Pat. Nos. 4,226,095; 4,877, 117; and 5,059,161 when friction ring 86 or 252 is axially displaced to engage annular friction engageable portion 34. However, when friction ring 86 or 252 is axially displaced from annular friction engageable portion 34, clutches A and A' of the present invention continue to drive the fan blades through eddy current drive 224 whereas the clutches of U.S. Pat. Nos. 4,425,993; 4,226,095; and 4,877,117 provide no driving connection to the fan blades. Specifically, due to their mounting to the input portions, magnets 226 of clutches A and A' of FIGS. 1–5 and ring 238 of clutch A' of FIG. 7 rotate at engine speed whether or not portion 34 is engaged by friction ring 86 or 252. Due to the magnetic attraction of magnets 226 to ring 242, the output portions of clutches A and A' are driven and rotate about the clutch axis at a speed less than that of the input portions or in other words at less than engine speed due to the torque load placed on the output portions by the fan blades. Thus, clutches A and A' of the present invention can provide cooling at all times and specifically whether or not friction disc 86 or 252 engages friction engageable portion 34. It should further be appreciated that no separate controls or other actuation are required for eddy current drive 224 such that clutch A and A' of the present invention can be easily substituted in prior installations utilizing clutches of the type disclosed in U.S. Pat. Nos. 4,425,993; 4,226,095; and 4,877,117 or the like. In particular, no electric controls such as would be necessary for electromagnetically operable drives are required according to the preferred teachings of the present invention. Specifically, when fluid actuated, clutches A and A' of the present invention including eddy current drive 224 have the same operation as the clutches of U.S. Pat. Nos. 4,425,993; 4,226,095; and 4,877,117 which do not include the eddy current drive. However, in the absence of fluid pressure and without actuation of any kind, eddy current drive 224 is then revealed in clutches A and A' of the present invention to drive and rotate the fan blades rather than to simply let the fan blades be rotationally free as in the clutches of U.S. Pat. Nos. 4,425,993; 4,226,095; and 4,877,117.

Furthermore, the particular construction of clutch A according to the teachings of the present invention is believed to be particularly advantageous. In this regard, clutch A of the present invention obtains similar advantages as those obtained by clutch A of U.S. Pat. No. 4,425,993. Additionally, eddy current drive 224 is included inside of housings 62 and 68 and is protected thereby from the environment or other outside forces. Even when housing 68 is removed from housing 62 to allow replacement of friction ring 86 or 252, eddy current drive 224 is generally enclosed by housing 62 and friction disc 28 which typically remain in an assembled condition during replacement of friction ring 86 or 252. Further, eddy current drive 224 is included inside of clutch A with minimal or no increase in axial length and specifically without requiring the addition of further disc or other mounting components. Specifically, magnets 226, holder 228, and ring 236 are mounted to friction disc 28, and rings 238 and 242 are mounted to housing 62, with housing 62 and friction disc 28 being necessary components for providing direct drive actuation through friction ring 86 or 252.

It should also be noted that the construction of clutch A allows a single bearing 58 and specifically provides rigidity which braces outer race 60 of bearing 58 by supporting housings 62 and 68 through the engagement of friction disc 28 and friction ring 86 or 252 by directing load forces to friction disc 28 which in turn is directly connected to the rigid support which is the shaft or other rotatable member that mounts the entire clutch A.

Clutch A of the type as shown in FIGS. 3 and 4 is further believed to be particularly advantageous. Specifically, when clutch A is utilized in its preferred form as a fan clutch mounted on the crank shaft of an engine such as, in the preferred form, a diesel engine, clutch A is subjected to tremendous vibration stress or loads due to the torsional modes set up by the reciprocating action of the pistons of the engine. This torsional vibration causes constant clatter in the axially displaceable components of the clutch. When the components allowing axial displacement are formed of metal which typically is cast iron or aluminum with an anodized hard coat surface, this constant clatter in the axially displaceable, metal components results in the development of a very sloppy fit in a relatively short period of time thus reducing the life of the clutch. According to the preferred teachings of the present invention, use of fiber friction ring 252 acts as a dampener between housing 62 and friction disc 28. Specifically, friction ring 252 is formed of friction brake material that is resilient enough to absorb the torsional vibration and reform itself to its original condition to withstand the punishment of vibration stress or loads due to the torsional modes set up by the reciprocating action of the pistons of an engine. It can be appreciated that friction ring 252 can be inexpensively fabricated at the desired axial thickness to provide teeth 254 with the necessary bearing surface with teeth 250 to transfer the desired torque levels without damaging teeth 254. It should further be appreciated that in the event of excessive vibration stress or loading, failure will occur in teeth 254 of fiber friction ring 252 and not in the metal components such as teeth 250, housings 62 and 68 or friction disc 28, with friction ring 252 being a normally replaceable part due to frictional wear. It can then be appreciated that torque pins 132, bushings 134, and holes 136 are not required in clutch A of FIGS. 3 and 4 which are especially prone to the development of sloppy fits, and also reducing the complexity and weight of clutch A of FIGS. 3 and 4.

Similarly, clutch A' of the type as shown in FIGS. 5–10 is further believed to be particularly advantageous. Particularly, eddy current drive 224 is included in clutch A' with no increase in axial length and without requiring the addition of further disc or other mounting components. Specifically, magnets 226, holder 228, and rings 236, 238 and 242 are mounted to sheave 50' or to friction disc 12', with sheave 50' and friction disc 12' being necessary components for providing direct drive actuation through friction ring 86. Furthermore, clutch A' of FIG. 7 according to the preferred teachings of the present invention is further believed to be advantageous since eddy current drive 224 is included with minimal increase in radial size since magnets 226 and rings 238 and 242 are mounted at the same radial spacing from the clutch axis as friction ring 86.

Further, when clutches A and A' are utilized in their preferred form as a fan clutch, the fan blades of the output portion are driven either due to the rotational relation provided by the engagement of friction ring 86 or 252 with annular friction engagable portion 34 or by eddy current drive 224 of the present invention. However, there are occasions when it is desired that the fan blades remain stationary. Clutch A' according to the preferred teachings of the present invention includes provisions for rotatably relating hub 20' to a further portion of clutch A' which is stationary in the most preferred form and specifically to shaft 24'. Specifically, shaft 24' is secured to a radial flange mounting bracket 92' by any suitable means. Clutch A' further includes an annular piston 100' which is reciprocally received in a cylinder cavity 102' formed in bracket 92'. Piston 100' is biased into cavity 102' by a spring 104' sandwiched between a stop 262 held axially on shaft 24'. Piston 100' is moved in cavity 102' against the bias of spring 104' by fluid pressure introduced through inlet 106' formed in bracket 92'. Piston 100' includes an integral friction disc 264.

Clutch A' according to the preferred teachings of the present invention further includes an annular, radial extension 266 secured to the end of hub 20' opposite cylinder block 30' by any suitable means such as by screws 268. In the most preferred form, bearings 146' and 148' are sandwiched on hub 20' between extension 266 and washer 62'. A friction ring 270 is removably secured to and carried by extension 266 such as by screws 272. Friction ring 270 is engaged by friction disc 264 when air pressure is introduced into cavity 102' thereby rotatably relating hub 20', bracket 92', and shaft 24' and thus braking the fan blades secured to cylinder block 30' secured to hub 20' to prevent their windmilling due to the passing of air over the fan blades and to prevent their being driven by eddy current drive 224 in the most preferred form.

In operation of clutch A' of the most preferred form of the present invention, the fan blades of fan 300 can be rotated at engine speeds when fluid pressure is introduced into cylinder C thereby rotatably relating sheave 50' to hub 20'. In the preferred form, magnets 226 are axially spaced from ring 238 when friction ring 86 engages with annular friction engagable portion 34 which overrides eddy current drive 224. In the absence of fluid pressure into cylinder C and cavity 102', friction ring 86 is axially spaced from portion 34. Although magnets 226 in clutch A' of FIG. 5 are further axially spaced from ring 238 than when friction ring 86 was engaged with portion 34, the spacing between magnets 226 and ring 238 is such that the fan blades are driven by eddy current drive 224. It can be appreciated that the axial spacing of magnets 226 from ring 238 in clutch A' of FIG. 7 actually increases when friction ring 86 is engaged with portion 34 to avoid even the possibility of a problem of magnets 226 contacting ring 238 due to long-term frictional wear of friction ring 86. If fluid pressure is introduced into cavity 102', eddy current drive 224 is also over-ridden as hub 20' is rotatably related to bracket 92' thus slowing and stopping rotation of the fan blades. Suitable valving should be provided to prevent fluid pressure from being simultaneously introduced into cylinder C and cavity 102'. It can then be appreciated that clutch A' according to the teachings of the present invention provides three speeds for the fan blades, i.e. at engine speed, at less than engine speed, and stopped in the most preferred form.

Furthermore, when air actuated, i.e. when fluid pressure is introduced into cylinder C, the force transfer path through clutch A' is from friction ring 86, through friction disc 12' to hub 20' through splines 16' and 18', through bearings 146' and 148', through sheave 50', and back to friction ring 86, with no relative rotation occurring through bearings 146' and 148' between hub 20' and sheave 50'. No actuation force occurs through bearings 26' and 28'. Thus, substantially less force is placed upon bearings 26' and 28' in the construction of clutch A' according to the preferred teachings of the present invention than through the bearings which mount the hub in the clutches of U.S. Pat. Nos. 4,226,095 and 4,877,117 which are in the actuation force path and with the bearings which mount the sheave being subjected to relative rotation at all times that the engine is running thus increasing wear and decreasing life. The construction of clutch A' of the preferred form further includes piston 10' having an increased cross-sectional area to allow greater actuation pressure to be placed upon friction disc 12' with the same fluid pressure. This greater actuation pressure allows the size of friction ring 86 to be minimized while still providing the same degree of actuation such that the overall diametric size of clutch A' can be reduced from clutches of the type of U.S. Pat. Nos. 4,226,095; 4,877,117; and 5,059,161 having corresponding performance characteristics. Thus, clutch A' according to the preferred teachings of the present invention is able to fit in smaller installations or the same size installations with eddy current drive 224 as prior installations utilizing clutches of the type disclosed in U.S. Pat. Nos. 4,226,095; 4,877,117; and 5,059,161.

It should be noted that clutches A and A' according to the preferred teachings of the present invention have a construction which is very simple in nature, lends itself to very economical manufacturing, and is very durable.

Now that the basic teachings of the present invention have been explained, many extensions and variations will be obvious to one having ordinary skill in the art. For example, although clutch A is shown in FIGS. 3 and 4 in the most preferred form including a multiple speed drive and specifically eddy current drive 224 and is believed to produce synergistic results, it can be appreciated that clutch A of FIGS. 3 and 4 could be manufactured without a multiple speed drive.

Further, clutch A of FIGS. 3 and 4 could be easily changed to be spring engaged and fluid released. As an example, friction disc 28 could be arranged to contact the other side of friction ring 252 which is biased by springs to engage friction disc 28 and which is disengaged by fingers coming out from piston 80 and radially spaced outwardly of friction disc 28.

Likewise, although shown and described for use as a fan clutch, clutches A and A' and especially the clutch of the form of FIGS. 3 and 4, according to the teachings of the present invention, may be utilized in other applications such as, but not limited to, for driving an alternator, an air conditioner, or the like.

Furthermore, although clutch A' of FIGS. 5–10 in the most preferred form includes eddy current drive 224 and is believed to produce synergistic results, eddy current drive 224 can be omitted with friction ring 270 and friction disc 264 preventing windmilling when clutch A' is not air actuated.

Likewise, although placement of the components of eddy current drive 224 on the input and outputs of clutches A and A' is believed to be advantageous in the particular preferred forms shown, reversal of the components of eddy current drive 224 on the input and output may be possible according to the teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Rotational control apparatus comprising, in combination: an input rotatable about an axis; an output, with the input rotatable about the axis relative to the output, with each of the input and the output including a friction engaging surface rotatably fixed thereto at a radial spacing from the axis; means for engaging the friction engaging surfaces of the input and output together to rotatably relate the input and output in an engaged condition and for disengaging the friction engaging surfaces of the input and output in a disengaged condition, with the output including a first, slideably mounted friction disc portion, with the first, friction disc portion being reciprocal between a first position to rotatably relate the first, friction disc portion to the input and a second position with the friction engaging surfaces in the disengaged condition; and an eddy current drive including permanent magnets and a ring of magnetic material, with one of the ring of magnetic material and the permanent magnets being carried by the input and the other of the ring of magnetic material and the permanent magnets being mounted on the first, friction disc portion.

2. The rotational control apparatus of claim 1 wherein the output is driven either with the input when the friction engaging surfaces are in the engaged condition or at a rotational speed less than the input when the friction engaging surfaces are in the disengaged condition by the eddy current drive and without separate controls for the eddy current drive whereby the output is driven with the rotational speed of the output being controlled by and dependent upon the condition of the friction engaging surfaces.

3. The rotational control apparatus of claim 1 wherein the first, friction disc portion is slideably mounted on and rotationally related to a hub rotatably mounted on a shaft, with the input being rotatable relative to the hub and to the shaft, with the first, friction disc portion being reciprocal on the hub and in the first position rotatably relates the first, friction disc portion to the input to drive the hub.

4. The rotational control apparatus of claim 3 further comprising, in combination: means for rotating the hub on the shaft at a speed different from the speeds when the first, friction disc portion is in the first and second positions.

5. The rotational control apparatus of claim 4 wherein the different speed rotating means comprises, in combination: a second, friction disc portion slideable and rotationally related to the shaft, with the second, friction disc portion being reciprocal between a first position to rotatably relate the second, friction disc portion and the hub and a second position with the hub not being rotatably related to the second, friction disc portion and the shaft.

6. The rotational control apparatus of claim 1 wherein one of the ring of magnetic material and the permanent magnets is mounted on the first, friction disc portion opposite to the friction engaging surface.

7. The rotational control apparatus of claim 6 wherein the ring of material and permanent magnets have an increased spacing as the first, friction disc portion is reciprocated from its second position to its first position.

8. The rotational control apparatus of claim 6 wherein the one of the ring of magnetic material and the permanent magnets carried by the input is mounted to an annular body portion; and wherein the rotational control apparatus further comprises, in combination: means on the annular body portion for providing angular and perpendicular air flow during rotation of the input for cooling the annular body portion.

9. The rotational control apparatus of claim 8 wherein the air flow providing means comprises circumferentially spaced cooling fins formed on the annular body portion opposite to the other of the ring of magnetic material and the permanent magnets.

10. The rotational control apparatus of claim 9 wherein the annular body portion includes first, second, third, and fourth quadratures, with the cooling fins in the first and third quadratures arranged solely at an acute angle from radial lines from the axis in the direction of rotation and the cooling fins in the second and fourth quadratures arranged along radial lines from the axis.

11. The rotational control apparatus of claim 6 wherein the one of the ring of magnetic material and the permanent magnets carried by the input is mounted to an annular body portion, with the annular body portion being mounted to the input by an annular support, with the annular support including vanes located radially outward of the ring of magnetic material and the permanent magnets for drawing air radially outwardly intermediate the ring of magnetic material and the permanent magnets.

12. The rotational control apparatus of claim 1 wherein the ring of magnetic material and the permanent magnets are at the radial spacing from the axis of the friction engaging surfaces of the input and output.

13. The rotational control apparatus of claim 1 wherein the output is driven at all times.

14. In a rotational control apparatus including a first, friction disc portion slideably mounted on and rotationally related to a hub rotatably mounted about an axis on a shaft and including an input rotatable about the axis and relative to the hub and to the shaft at a first rotational speed, with the first, friction disc portion being reciprocal on the hub between a first position to rotatably relate the first, friction disc portion to the input to drive the hub at the first rotational speed and a second position, the improvement comprising means for rotating the hub on the shaft at a second speed different from the first rotational speed when the first, friction disc portion is in the second position with the rotating means including a first drive component carried by the input and a second drive component mounted to the first, friction disc portion, with the spacing between the first and second drive components changing as the first friction disc portion moves from the second position to the first position.

15. The rotational control apparatus of claim 14 wherein the first, friction disc portion is rotatably related to the input by a friction ring engaging an annular friction engageable portion, with the friction ring and the engageable portion being at a radial spacing from the axis, with the first and second drive components being at the radial spacing from the axis.

16. The rotational control apparatus of claim 15 wherein the second speed is slower than the first speed.

17. The rotational control apparatus of claim 16 wherein the rotating means comprises an eddy current drive.

18. The rotational control apparatus of claim 17 wherein the second drive component is one of permanent magnets and a ring of magnetic material and the first drive component is the other of the permanent magents and the ring of magnetic material.

19. The rotational control apparatus of claim 14 further comprising, in combination: means for rotating the hub on the shaft at a third speed different from the first and second speeds when the first, friction disc portion is in the second position.

20. The rotational control apparatus of claim 19 wherein the third speed is zero such that relative rotation does not occur between the hub and the shaft.

21. The rotational control apparatus of claim 20 wherein the third speed rotating means comprises, in combination: a second, friction disc portion slideable and rotationally related to the shaft, with the second, friction disc portion being reciprocal between a first position to rotatably relate the second, friction disc portion and the hub to brake the hub and a second position with the hub being rotatably independent from the second, friction disc portion and the shaft.

22. The rotational control apparatus of claim 14 wherein the input is rotatably mounted on the hub.

23. The rotational control apparatus of claim 14 wherein the first drive component is mounted to an annular body portion, with the annular body portion being mounted to the input by an annular support, with the annular support including vanes located radially outward of the first and second drive components for drawing air radially outwardly intermediate the first and second drive components.

24. The rotational control apparatus of claim 14 wherein the output is driven at all times.

25. In a rotational control apparatus including an input rotatable about an axis, an output, with the input rotatable about the axis relative to the output, and first and second drive components carried by the input and output, respectively, for rotatably relating the input and the output, the improvement comprising, in combination: an annular body portion including first, second, third, and fourth quadratures, with one of the first and second drive components mounted to the annular body portion; and circumferentially spaced cooling fins formed on the annular body portion opposite to the one of the first and second drive components, with each of the cooling fins having first radial ends located generally the same radial distance from the axis and having second radial ends located generally the same radial distance from the axis and which is greater than the radial distance of the first radial ends, with the cooling fins in the first and third quadratures arranged at an acute angle from radial lines from the axis in the direction of rotation and the cooling fins in the second and fourth quadratures arranged along radial lines from the axis.

26. The rotational control apparatus of claim 25 wherein the annular body portion is mounted by an annular support, with the annular support including vanes located radially outward of the first and second drive components for drawing air radially outwardly intermediate the first and second drive components.

27. The rotational control apparatus of claim 26 wherein the output includes a mount having an outer annular portion forming a pilot extension for removably mounting a fan to the output, with the mount having openings radially inward of the pilot extension and of the first and second drive components, with the vanes drawing air through the openings and intermediate the first and second drive components.

28. The rotational control apparatus of claim 25 wherein the cooling fins in the first and second quadratures are arranged solely at the acute angle.

29. The rotational control apparatus of claim 28 wherein the cooling fins in the second and fourth quadratures are arranged solely along radial lines from the axis.

30. The rotational control apparatus of claim 25 wherein the cooling fins extend axially from the annular body portion and terminate in free edges free of interconnection to any other portion of the rotational control apparatus.

31. In a rotational control apparatus in the form of a fan clutch for controlling the rotation of a fan and including an input rotatable about an axis, an output, with the input rotatable about the axis relative to the output, and first and second drive components carried by the input and output, respectively, for rotatably relating the input and the output, the improvement comprising, in combination: vanes located radially outward of the first and second drive components for drawing air radially outwardly intermediate the first and second drive components for creating air flow between the first and second drive components to provide cooling for the first and second drive components; and a mount having an outer annular portion forming a pilot extension for removably, slideably, mounting the fan to the output, with the mount having openings radially inward of the pilot extension and of the first and second drive components, with the vanes drawing air through the openings and intermediate the first and second drive components.

32. The rotational control apparatus of claim 31 wherein the first drive component is mounted to the input by an annular support, with the annular support including the vanes.

* * * * *

UNITED STATES PATENT AND TRADEMARK OFFICE
CERTIFICATE OF CORRECTION

PATENT NO. : 5,636,719 C1
APPLICATION NO. : 08/373953
DATED : June 10, 1997
INVENTOR(S) : Davis et al.

Page 1 of 1

It is certified that error appears in the above-identified patent and that said Letters Patent is hereby corrected as shown below:

Title Pg, Item (73) Assignee of Ex Parte Reexamination Certificate, delete "Dade Behring Marburg GmbH, Marburg (DE)", insert --Horton, Inc., Minneapolis, Minn.--
Column 01, line 43 of Ex Parte Reexamination Certificate, delete "first", insert --first,--
Column 01, line 64 of Ex Parte Reexamination Certificate, delete "first", insert --first,--
Column 02, line 27 of Ex Parte Reexamination Certificate, delete "first", insert --first,--
Column 02, line 51 of Ex Parte Reexamination Certificate, delete "first", insert --first,--
Column 03, line 04 of Ex Parte Reexamination Certificate, delete "first", insert --first,--
Column 04, line 25 of Ex Parte Reexamination Certificate, delete "first", insert --first,--
Column 04, line 26 of Ex Parte Reexamination Certificate, delete "friction", insert --position--

Signed and Sealed this

Twenty-seventh Day of July, 2010

David J. Kappos
*Director of the United States Patent and Trademark Office*

US005636719C1

(12) EX PARTE REEXAMINATION CERTIFICATE (7539th)
United States Patent
Davis et al.

(10) Number: US 5,636,719 C1
(45) Certificate Issued: Jun. 1, 2010

(54) ROTATIONAL CONTROL APPARATUS

(75) Inventors: John B. Davis, Tonka Bay, MN (US); Robert C. Bredt, Edina, MN (US); Kent Carlson, Lake City, SD (US); Darren Reasy, Pierpont, SD (US)

(73) Assignee: Dade Behring Marburg GmbH, Marburg (DE)

Reexamination Request:
No. 90/009,469, May 21, 2009

Reexamination Certificate for:
Patent No.: 5,636,719
Issued: Jun. 10, 1997
Appl. No.: 08/373,953
Filed: Jan. 17, 1995

Related U.S. Application Data

(63) Continuation-in-part of application No. 08/254,290, filed on Jun. 6, 1994, now Pat. No. 5,611,415, which is a continuation-in-part of application No. 08/201,783, filed on Feb. 25, 1994, now Pat. No. 5,613,586.

(51) Int. Cl.
*F16D 25/0638* (2006.01)
*F16D 67/04* (2006.01)
*F16D 47/00* (2006.01)
*F01P 7/02* (2006.01)

(52) U.S. Cl. .................. 192/18 A; 192/113.21; 192/113.23; 192/48.2; 192/48.4; 192/48.91; 192/70.12; 310/105

(58) Field of Classification Search .................. None
See application file for complete search history.

(56) References Cited

U.S. PATENT DOCUMENTS

| | | | |
|---|---|---|---|
| 1,371,391 A | 3/1921 | Ollard | |
| 1,827,348 A | 10/1931 | Bing | |
| 2,259,461 A | 10/1941 | Eason | |
| 2,317,135 A | 4/1943 | Crittenden et al. | |
| 2,437,871 A | 3/1948 | Wood | |

(Continued)

FOREIGN PATENT DOCUMENTS

DE 3443524 A1 6/1986

(Continued)

OTHER PUBLICATIONS

"Welcome to KitMasters," [online], Kit Masters, 2004, [retrieved on Dec. 14, 2000]. Retrieved from the Internet: <URL.www.kit–masters.com>, 7 pages.

(Continued)

*Primary Examiner*—William C Doerrler

(57) ABSTRACT

Rotational control apparatus in the forms of fan clutches (A, A') are shown including an eddy current drive (224). Specifically, the eddy current drive (224) includes a plurality of permanent magnets (226) mounted circumferentially spaced and with alternating polarity by a holder (228) to the input or output of the clutch (A, A') and a magnetically conductive ring (242) mounted to the other of the input or output of the clutch (A, A'). Thus, the output portion and the fan blades mounted thereto are driven at engine speeds when the clutch (A, A') is air actuated and are driven at a rotational speed less than engine speed by the eddy current drive (224) when the clutch (A, A') is not air actuated and without separate controls for the eddy current drive (224). A housing (62) comprises the output portion of the clutch (A) which is rotatably mounted by a bearing (58) to the hub portion (24) of a friction disc (28) which comprises the input portion of the clutch (A). In other forms, the output portion of the clutch (A') is in the form of a hub (20') rotatably mounted on a stationary shaft (24') and the input portion is in the form of a sheave (50') rotatable relative to the hub (20') and the shaft (24'). Additionally, the hub (20') can be braked by rotatably relating the hub (20') to the shaft (24'). In one form, the friction ring (252) includes peripheral gear teeth (256) in slideable gearing relation with gear teeth (250) formed in the housing (62) and is formed of fiber brake material to act as a dampener between the friction disc (28) and the housing (62) to absorb torsional vibration.

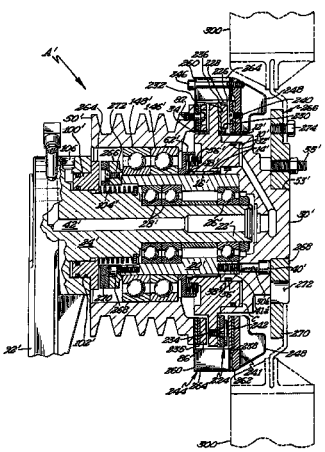

U.S. PATENT DOCUMENTS

| | | | |
|---|---|---|---|
| 2,470,596 | A | 5/1949 | Winther et al. |
| 2,606,948 | A | 8/1952 | Jaeschke |
| 2,769,932 | A | 11/1956 | Zozulin et al. |
| 3,077,252 | A | 2/1963 | Treer |
| 3,202,252 | A | 8/1965 | Schilling |
| 3,253,687 | A | 5/1966 | Young |
| 3,303,367 | A | 2/1967 | Jaeschke et al. |
| 3,312,319 | A | 4/1967 | Carroll et al. |
| 3,396,909 | A | 8/1968 | Seifert |
| 3,409,305 | A | 11/1968 | Nieland |
| 3,458,122 | A | 7/1969 | Andriussi et al. |
| 3,468,402 | A | 9/1969 | Edwards |
| 3,684,397 | A | 8/1972 | Elmer |
| 3,709,342 | A | 1/1973 | Spencer |
| 3,742,270 | A | 6/1973 | Jaeschke |
| 3,762,517 | A | 10/1973 | Hanks |
| 4,132,301 | A | 1/1979 | Zabonick |
| 4,138,618 | A | 2/1979 | Jaeschke |
| 4,199,048 | A | 4/1980 | Ishikawa |
| 4,226,095 | A | 10/1980 | Loken |
| 4,231,457 | A | 11/1980 | Cornish |
| 4,355,710 | A | 10/1982 | Schilling |
| 4,358,695 | A | 11/1982 | MacDonald et al. |
| 4,379,242 | A | 4/1983 | MacDonald |
| 4,408,685 | A | 10/1983 | Schilling et al. |
| 4,410,819 | A | 10/1983 | Kobayashi et al. |
| 4,418,807 | A | 12/1983 | Raines |
| 4,423,803 | A | 1/1984 | Malloy |
| 4,450,947 | A | 5/1984 | Hanks |
| 4,456,110 | A | 6/1984 | Hanks et al. |
| 4,460,079 | A | 7/1984 | Hanks |
| 4,476,410 | A | 10/1984 | Wolcott |
| 4,483,430 | A | 11/1984 | Carmichael et al. |
| 4,534,454 | A | 8/1985 | Brooks |
| 4,540,481 | A | 9/1985 | Sawyer et al. |
| 4,541,516 | A | 9/1985 | Fenzel |
| 4,570,849 | A | 2/1986 | Klaucke et al. |
| 4,630,718 | A | 12/1986 | Hanks |
| 4,633,991 | A | 1/1987 | Hanks et al. |
| 4,648,493 | A | 3/1987 | Schilling et al. |
| 4,657,126 | A | 4/1987 | Hanks et al. |
| 4,679,675 | A | 7/1987 | Hanks et al. |
| 4,683,392 | A | 7/1987 | MacDonald et al. |
| 4,750,595 | A | 6/1988 | Dayen et al. |
| 4,770,281 | A | 9/1988 | Hanks |
| 4,830,161 | A | 5/1989 | Hall et al. |
| 4,846,315 | A | 7/1989 | Dayen |
| 4,857,785 | A | 8/1989 | McCarty |
| 4,872,535 | A | 10/1989 | Dayen et al. |
| 4,877,117 | A | 10/1989 | Kniebel et al. |
| 4,934,500 | A | 6/1990 | Hanks et al. |
| 5,052,988 | A | 10/1991 | Ishikawa et al. |
| 5,059,161 | A | 10/1991 | Bredt |
| 5,105,928 | A | 4/1992 | Saeki et al. |
| 5,215,175 | A | 6/1993 | Fenzel |
| 5,219,050 | A | 6/1993 | Kubomiya |
| 5,242,036 | A | 9/1993 | Hennessy et al. |
| 5,355,983 | A | 10/1994 | Radomski et al. |
| 5,363,912 | A | 11/1994 | Wolcott |
| 5,398,794 | A | 3/1995 | Walberg et al. |
| 5,558,495 | A | 9/1996 | Parker et al. |
| 5,586,635 | A | 12/1996 | Nelson et al. |
| 5,624,016 | A | 4/1997 | Coulter et al. |
| 5,636,719 | A | 6/1997 | Davis et al. |
| 5,746,580 | A | 5/1998 | Parker et al. |

FOREIGN PATENT DOCUMENTS

| | | | |
|---|---|---|---|
| DE | 3915065 | A1 | 11/1989 |
| DE | 4121240 | A1 | 1/1993 |
| DE | 4207709 | | 9/1993 |
| SU | 731918 | | 5/1980 |

OTHER PUBLICATIONS

"Fan Clutch Overhaul Instructions," Kit Masters, Ramsey, MN, 7 pages, date unknown.

"Kysor On/Off Diagnostic Guide," Borg Warner, http://www.ets.borgwarner.com, 2 pages, Jun. 2002.

"Fail Safe™ On/Off K22FA Front Air Fan Drives," Quik–Kool™ Cooling System Components, 20 pages, Jun. 2002.

"Fail Safe™ On/Off K22RA Rear Air Fan Clutch Service Guide," Quik–Kool™ Cooling System Components, 2 pages, Jun. 2002.

"Fail Safe™ On/Off K22FA Front Air Fan Clutch Service Guide," Quik–Kool™ Cooling System Components, 2 pages, Jun. 2002.

"Fail Safe™ On/Off K22RA/K22FA Front Air/Rear Air Lining Replacement," Quik–Kool™ Cooling System Components, 2 pages, Jun. 2002.

"Fail Safe™ On/Off K22RA/K26RA Rear Air Fan Clutch Replacement," Quik–Kool™ Cooling System Components, 2 pages, Jun. 2002.

"Fail Safe™ On/Off K22FA Front Air Line Installation," Quik–Kool™ Cooling System Components, 20 pages, Jun. 2002.

"Fail Safe™ On/Off K22RA/K26RA Fan Hub Series," Quik–Kool™ Cooling System Components, 4 pages, Jun. 2002.

"Fail Safe™ On/Off K26RA Rear Air Lining Replacement," Quik–Kool™ Cooling System Components, 2 pages, Jun. 2002.

"Fail Safe™ On/Off K26RA Rear Air Fan Clutch Series 1090–09500," Quik–Kool™ Cooling System Components, 6 pages, Jun. 2002.

"Fail Safe™ On/Off K22RA Rear Air Clutch Series," Quik–Kool™ Cooling System Components, 8 pages, Jun. 2002.

"Drive Master® Spring–Engaged Fan Drives," Horton Product Catalogs, http://www.hortoninc.com/products/products.asp, printed from the Internet on Oct. 27, 2005, 2 pages.

"Drive Master® Reman Spring–Engaged Fan Drives," Horton Product Catalogs, http://www.hortoninc.com/products/products.asp, printed from the Internet on Oct. 27, 2005, 2 pages.

"Drive Master® Two–Speed Fan Drives," Horton Product Catalogs, http://www.hortoninc.com/products/products.asp, printed from the Internet on Oct. 27, 2005, 2 pages.

"Drive Master® PolarExtreme Spring–Engaged Fan Drives," Horton Product Catalogs, http://www.hortoninc.com/products/products.asp, printed from the Internet on Oct. 27, 2005, 2 pages.

"HT/S Advantage™ Air–Engaged Fan Drives," Horton Product Catalogs, http://www.hortoninc.com/products/products.asp, printed from the Internet on Oct. 27, 2005, 2 pages.

"Advantage Reman® Remanufactured Air–Engaged On/Off Fan Drives," http://www.hortoninc.com/products/products.asp, printed from the Internet on Oct. 27, 2005, 2 pages.

"PolarExtreme HT/S Reman Fan Drives," http://www.hortoninc.com/products/products.asp, printed from the Internet on Oct. 27, 2005, 2 pages.

"Klondike® Series Replacement Fan Clutches for K22RA Kits for Kysor's K22RA and K22FA," http://www.hortoninc.com/products/products.asp, printed from the Internet on Oct. 27, 2005, 3 pages.

"Klondike® Series Replacement Fan Clutch for Kysor's K22RA," Horton, Inc., 2 pages, 2004.
"Bendix® FD–L™ Fan Clutch," Bendix Service Data SD–09–8505, 8 pages, Apr. 2004.
"Bendix® FD–1™ Clutch Type Fan Drive," Bendix Service Data SD–09–8501, 8 pages, Apr. 2004.
"Bendix® FD–2™ Clutch Type Fan Drive," Bendix Service Data SD–09–8503, 8 pages, Apr. 2004.
"Bendix® FD–3™ TorqueMaster Fan Clutch," Bendix Service Data SD–09–8504, 8 pages, Apr. 2004.
Bendix Catalog Index, 20 pages, date unknown.
Horton Catalog, 71 pages, Mar. 1998.
"The Kysor K–22RA Fail Safe™ On–Off Fan Clutch," BorgWarner Cooling Systems, Apr. 2000, 2 pages.
"K–22RA Fan Drive," Kysor Cadillac, 22 pages, Jul. 1996.
"Engine Cooling Fans. Fan Spacers & Adapters," Horton, Inc., pp. 47–48, Jun. 2002.
"Installation and Service Guide—Kysor Front Air Fan Drives," Kysor Cooling Systems N.A., 24 pages, Oct. 1998.
BorgWarner 2004 Product Catalog, front and back covers and pp. 92–256 and 341–389.
Horton Heavy–Duty Vehicle Components Catalog, Jul. 2004, front and back covers and Table of Contents, pp. I–V.
Shigley et al., Power Transmission Elements—A Mechanical Designer's Workbook, 1990, New York, McGraw–Hill, pp. 76, 91–95.
"Eddy Current", publication name unknown, publication date unknown (faxed Feb. 4, 1994) (3 pages).

US 5,636,719 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–9, 12 and 13 is confirmed.

Claims 14, 15, 18, 19, 22 and 23 are determined to be patentable as amended.

Claims 16, 17, 20, 21 and 24, dependent on an amended claim, are determined to be patentable.

New claims 33–49 are added and determined to be patentable.

Claims 10, 11 and 25–32 were not reexamined.

14. In a rotational control apparatus including a first, friction disc portion slideably mounted on and rotationally related to a hub rotatably mounted about an axis on a shaft and including an input rotatable about the axis and relative to the hub and to the shaft at a first rotational speed, with the first, friction disc portion being reciprocal on the hub between a first position to rotatably relate the first, friction disc portion to the input to drive the hub at first rotational speed and a second position, the improvement comprising means for rotating the hub [on] *relative to* the shaft at a second speed different from the first rotational speed when the first, friction disc portion is in the second position with the rotating means including a first drive component carried by the input and a second drive component mounted to the first, friction disc portion, with the spacing between the first and second drive components changing as the first friction disc portion moves from the second position to the first position.

15. [The] *In a* rotational control apparatus [of claim 14] *including a first, friction disc portion slideably mounted on and rotationally related to a hub rotatably mounted about an axis on a shaft and including an input rotatable about the axis and relative to the hub and to the shaft at a first rotational speed, with the first, friction disc portion being reciprocal on the hub between a first position to rotatably relate the first, friction disc portion to the input to drive the hub at the first rotational speed and a second position, the improvement comprising*
*means for rotating the hub on the shaft at a second speed different from the first rotational speed when the first, friction disc portion is in the second position with the rotating means including a first drive component carried by the input and a second drive component mounted to the first, friction disc portion, with the spacing between the first and second drive components changing as the first friction disc portion moves from the second position to the first position,*
wherein the first, friction disc portion is rotatably related to the input by a friction ring engaging an annular friction engageable portion, with the friction ring and the engageable portion being at a radial spacing from the axis, with the first and second drive components being at the radial spacing from the axis.

18. The rotational control apparatus of claim 17 wherein the second drive component is one of permanent magnets and a ring of magnetic material and the first drive component is the other of the permanent [magents] *magnets* and the ring of magnetic material.

19. [The] *In a* rotational control apparatus [of claim 14] *including a first, friction disc portion slideably mounted on and rotationally related to a hub rotatably mounted about an axis on a shaft and including an input rotatable about the axis and relative to the hub and to the shaft at a first rotational speed, with the first, friction disc portion being reciprocal on the hub between a first position to rotatably relate the first, friction disc portion to the input to drive the hub at the first rotational speed and a second position, the improvement comprising*
*means for rotating the hub on the shaft at a second speed different from the first rotational speed when the first, friction disc portion is in the second position with the rotating means including a first drive component carried by the input and a second drive component mounted to the first, friction disc portion, with the spacing between the first and second drive components changing as the first friction disc portion moves from the second position to the first position;*
*and* further comprising, in combination: means for rotating the hub on the shaft at a third speed different from the first and second speeds when the first, friction disc portion is in the second position.

22. [The] *In a* rotational control apparatus [of claim 14] *including a first, friction disc portion slideably mounted on and rotationally related to a hub rotatably mounted about an axis on a shaft and including an input rotatable about the axis and relative to the hub and to the shaft at a first rotational speed, with the first, friction disc portion being reciprocal on the hub between a first position to rotatably relate the first, friction disc portion to the input to drive the hub at the first rotational speed and a second position, the improvement comprising*
*means for rotating the hub on the shaft at a second speed different from the first rotational speed when the first, friction disc portion is in the second position with the rotating means including a first drive component carried by the input and a second drive component mounted to the first, friction disc portion, with the spacing between the first and second drive components changing as the first friction disc portion moves from the second position to the first position,*
wherein the input is rotatably mounted on the hub.

23. [The] *In a* rotational control apparatus [of claim 14] *including a first, friction disc portion slideably mounted on and rotationally related to a hub rotatably mounted about an axis on a shaft and including an input rotatable about the axis and relative to the hub and to the shaft at a first rotational speed, with the first, friction disc portion being reciprocal on the hub between a first position to rotatably relate the first, friction disc portion to the input to drive the hub at the first rotational speed and a second position, the improvement comprising*
*means for rotating the hub on the shaft at a second speed different from the first rotational speed when the first, friction disc portion is in the second position with the rotating means including a first drive component car-* ried by the input and a second drive component mounted to the first, friction disc portion, with the spacing between the first and second drive components changing as the first friction disc portion moves from the second position to the first position, wherein the first drive component is mounted to an annular body portion, with the annular body portion being mounted to the input by an annular support, with the annular support including vanes located radially outward of the first and second drive components for drawing air radially outwardly intermediate the first and second drive components.

33. The rotational control apparatus of claim 1 wherein the means for engaging the friction engaging surfaces of the input and output together to rotatably relate the input and output in the engaged condition and for disengaging the friction engaging surfaces of the input and output in the disengaged condition comprises a pressure cylinder, a piston, and one or more springs configured to bias the piston, wherein the piston is positioned relative to the pressure cylinder such that pressurized fluid selectively introduced into the pressure cylinder moves the piston in opposition to a biasing force of the one or more springs.

34. The rotational control apparatus of claim 1 wherein the means for engaging the friction engaging surfaces of the input and output together to rotatably relate the input and output in the engaged condition and for disengaging the friction engaging surfaces of the input and output in the disengaged condition comprises a first force-generating mechanism and a second force-generating mechanism, wherein the first and second force-generating mechanisms are configured to generate forces in opposing directions.

35. The rotational control apparatus of claim 4 wherein the speed at which the means for rotating the hub on the shaft at a speed different from the speeds when the first, friction disc portion is in the first and second positions is zero to achieve braking of the hub.

36. The rotational control apparatus of claim 1 wherein one of the ring of magnetic material and the permanent magnets is mounted on the first, friction disc portion opposite to the friction engaging surface on the first, friction disc portion.

37. The rotational control apparatus of claim 1 wherein one of the ring of magnetic material and the permanent magnets is mounted on a first side of the first, friction disc portion and wherein the friction engaging surface is positioned at a second side of the first, friction disc portion, the first side located opposite the second side.

38. The rotational control apparatus of claim 1 wherein one of the ring of magnetic material and the permanent magnets is mounted on a first side of the first, friction disc portion and the friction engaging surface is positioned at a second side of the first, friction disc portion, whrerein the first side faces a different direction than the second side.

39. The rotational control apparatus of claim 1 and further comprising:
a first bearing positioned adjacent to the input;
a shaft extending radially inward of the input; and
a second bearing, wherein the second bearing is positioned adjacent to the shaft,
wherein the first bearing and the second bearing have different and non-overlapping radial positions.

40. The rotational control apparatus of claim 39 wherein the first bearing and the second bearing are axially spaced from each other.

41. The rotational control apparatus of claim 1, the eddy current drive further comprising:

a radially outer portion secured to the input, wherein the radially outer portion wraps around an outer diameter portion of the first, friction disc portion.

42. The rotational control apparatus of claim 1 wherein the first, friction disc portion is slideably mounted on and rotationally related to a hub rotatably mounted about an axis on a shaft, with the hub being rotatable relative to the shaft, and wherein the shaft is rotationally fixed.

43. The rotational control apparatus of claim 1 wherein the output is rotated by torque transmitted from the input to the output exclusively by the eddy current drive when the friction engaging surfaces are in the disengaged condition.

44. The rotational control apparatus of claim 1 wherein there are no electric controls for controlling torque transmission of the eddy current drive.

45. The rotational control apparatus of claim 1 wherein spacing between the permanent magnets and the ring of magnetic material of the eddy current drive when the first, friction disc portion is in the first position is different compared to when the first, friction disc portions is in the second position with the friction engaging surfaces in the disengaged condition.

46. The rotational control apparatus of claim 1 wherein spacing between the permanent magnets and the ring of magnetic material changes as the first friction disc portion moves from the second position to the first friction.

47. The rotational control apparatus of claim 1
wherein the means for engaging the friction engaging surfaces of the input and output together to rotatably relate the input and output in an engaged condition and for disengaging the friction engaging surfaces of the input and output in a disengaged condition comprises a pressure cylinder, a piston, and one or more springs configured to bias the piston, wherein the piston is positioned relative to the pressure cylinder such that pressurized fluid selectively introduced into the pressure cylinder moves the piston in opposition to a biasing force of the one or more springs,
wherein the output is rotated by torque transmitted from the input to the output exclusively by the eddy current drive when the friction engaging surfaces are in the disengaged condition, and
wherein spacing between the permanent magnets and the ring of magnetic material of the eddy current drive when the first, friction disc portion is in the first position is different compared to when the first, friction disc portion is in the second position with the friction engaging surfaces in the disengaged condition.

48. The rotational control apparatus of claim 1
wherein one of the ring of magnetic material and the permanent magnets is mounted on the first, friction disc portion opposite to the friction engaging surface of the first, friction disc portion,
wherein the output is rotated by torque transmitted from the input to the output exclusively by the eddy current drive when the friction engaging surfaces are in the disengaged condition, and
wherein spacing between the permanent magnets and the ring of magnetic material changes as the first friction disc portion moves from the second position to the first position.

49. The rotational control apparatus of claim 6
wherein the means for engaging the friction engaging surfaces of the input and output together to rotatably relate the input and output in an engaged condition and for disengaging the friction engaging surfaces of the input and output in a disengaged condition comprises a pressure cylinder, a piston, and one or more springs configured to bias the piston, wherein the piston is positioned relative to the pressure cylinder such that pressurized fluid selectively introduced into the pressure cylinder moves the piston in opposition to a biasing force of the one or more springs, wherein the output is rotated by torque transmitted from the input to the output exclusively by the eddy current drive when the friction engaging surfaces are in the disengaged condition, and wherein spacing between the permanent magnets and the ring of magnetic material of the eddy current drive when the first, friction disc portion is in the first position is different compared to when the first, friction disc portion is in the second position with the friction engaging surfaces in the disengaged condition.

\* \* \* \* \*